(12) United States Patent
Yuen

(10) Patent No.: US 12,162,653 B2
(45) Date of Patent: Dec. 10, 2024

(54) CAP WITH DUAL VALVE ASEPTIC SEALS

(71) Applicant: Avantor Fluid Handling LLC, Devens, MA (US)

(72) Inventor: Tat M. Yuen, Old Bridge, NJ (US)

(73) Assignee: Avantor Fluid Handling, LLC, Devens, MA (US)

( * ) Notice: Subject to any disclaimer, the term of this patent is extended or adjusted under 35 U.S.C. 154(b) by 324 days.

(21) Appl. No.: 17/885,881

(22) Filed: Aug. 11, 2022

(65) Prior Publication Data

US 2023/0047183 A1 Feb. 16, 2023

Related U.S. Application Data

(60) Provisional application No. 63/317,161, filed on Mar. 7, 2022, provisional application No. 63/232,259, filed on Aug. 12, 2021.

(51) Int. Cl.
*B65D 47/26* (2006.01)
*B65D 47/32* (2006.01)
*F16K 11/22* (2006.01)
*F16K 27/06* (2006.01)

(52) U.S. Cl.
CPC ........... *B65D 47/265* (2013.01); *B65D 47/32* (2013.01); *F16K 11/22* (2013.01); *F16K 27/065* (2013.01)

(58) Field of Classification Search
CPC .......... B65D 47/261–268; B65D 47/32; F16K 3/085; F16K 11/22; F16K 27/065
See application file for complete search history.

(56) References Cited

U.S. PATENT DOCUMENTS

| 2,699,776 | A | * | 1/1955 | Alexander | ................ F16K 5/04 |
| | | | | | 137/556 |
| 3,384,276 | A | * | 5/1968 | Henningfield | ....... B65D 47/265 |
| | | | | | 222/479 |
| 4,227,954 | A | | 10/1980 | Ward et al. | |
| 4,595,005 | A | | 6/1986 | Jinotti | |
| 5,256,160 | A | | 10/1993 | Clement | |
| 5,325,999 | A | | 7/1994 | Gueret | |
| 6,050,309 | A | * | 4/2000 | Woodruff | ............... B67D 7/344 |
| | | | | | 141/354 |
| 6,769,573 | B1 | * | 8/2004 | Kazarian | ............. B05B 11/1081 |
| | | | | | 222/144.5 |

(Continued)

OTHER PUBLICATIONS

International Search Report and Written Opinion for corresponding PCT/US2023/014242 dated May 19, 2023, 9 pages.

*Primary Examiner* — J C Jacyna
(74) *Attorney, Agent, or Firm* — Faegre Drinker Biddle & Reath LLP

(57) ABSTRACT

An aseptic closure system for attaching to a container including an upper section and a lower section that are removably attached to one another. Each section includes a valve housing with a rotary valve mounted in a bore extending through the valve housing. The upper section has an inlet port and an outlet port, each with a conduit providing fluid communication through the port to an interior of the upper valve housing. The lower section is adapted to mount to a container. The lower valve housing includes two conduits that permit fluid communication through the lower valve housing to an interior of the lower section. The rotation of the rotary valves closes off flow through the conduits in the respective housings.

20 Claims, 18 Drawing Sheets

(56) References Cited

U.S. PATENT DOCUMENTS

| | | | | |
|---|---|---|---|---|
| 7,651,003 | B2* | 1/2010 | Albers | B65D 47/263 |
| | | | | 222/525 |
| 2003/0084943 | A1* | 5/2003 | Tischler | F16K 31/041 |
| | | | | 137/624.11 |
| 2010/0170857 | A1* | 7/2010 | Williams | B01D 35/147 |
| | | | | 210/120 |
| 2018/0050844 | A1* | 2/2018 | Hirst | B65D 47/24 |
| 2018/0098651 | A1* | 4/2018 | Kelaher | A47G 19/2272 |
| 2020/0198845 | A1 | 6/2020 | Hopf et al. | |
| 2021/0214133 | A1* | 7/2021 | McConnell | B65D 47/0842 |

* cited by examiner

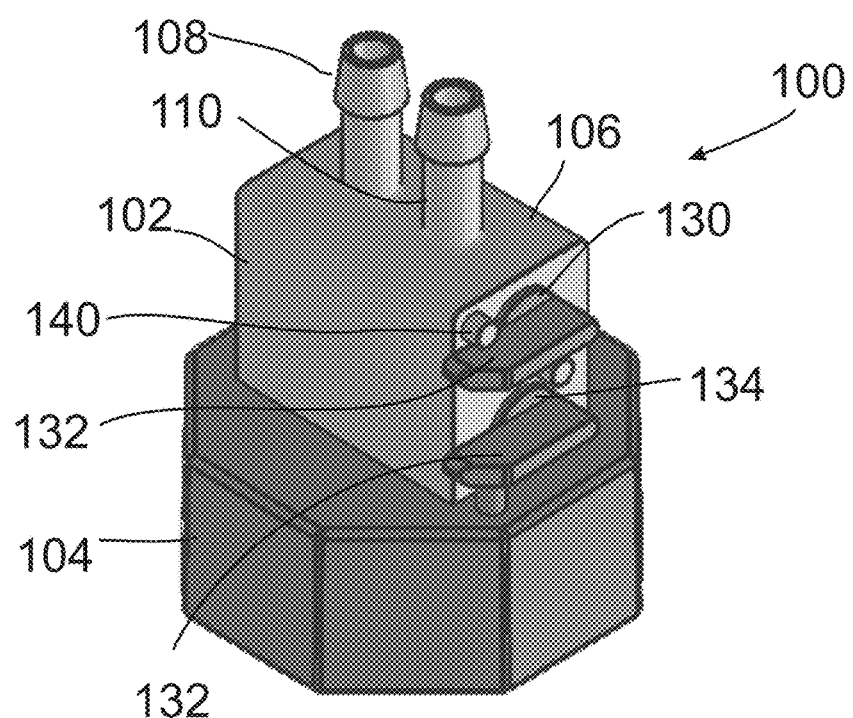
FIG. 2
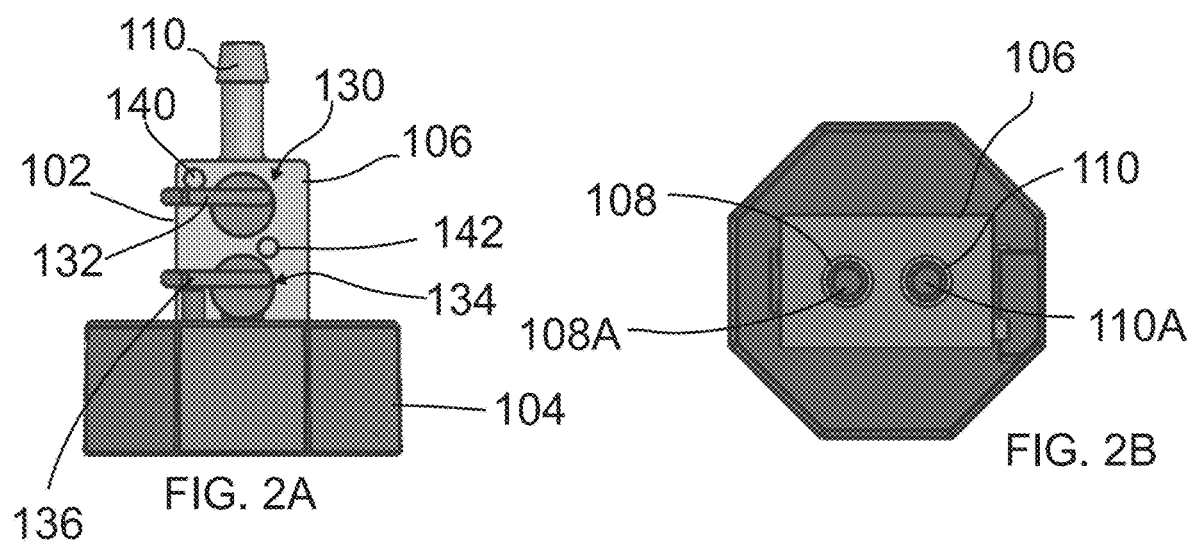
FIG. 2A
FIG. 2B

The cap is designed to seal both fluid paths

A simple twisting action is performed to counter align the fluid paths to allow for the seal Once the paths are sealed the cap allows for disconnect while aintaining sterility

CAP WITH DUAL VALVE ASEPTIC SEALS

RELATED APPLICATION

This application is related to and claims priority from U.S. Provisional Applications 63/317,161, filed Mar. 7, 2022, titled "Cap with Rotary Dual Plug Aseptic Seals" and 63/232,259 filed Aug. 12, 2021, titled "Cap with Dual Plug Aseptic Seals", the disclosures of which are incorporated herein by reference in their entireties.

FIELD OF THE INVENTION

The present invention is directed to a bottle cap or closure system that includes a mechanical action seals which, when closed, provide an aseptic seal through use of mechanical (plug) seals.

BACKGROUND

In some fluid systems, such as some bioprocessing fluid systems or blood handling systems, it may be desirable, or in some cases necessary, to includes a coupler that can aseptically connect and disconnect sterilized fluid lines, containers or equipment while maintaining sterility. For example, it may be desirable to aseptically connect and disconnect one or more fluid media bags or containers from a fluid line. In order to do so, an aseptic coupling is typically used to connect the fluid line or outlet on the fluid media container, while substantially inhibiting biological contamination of the fluid media container and the fluid line. Similarly, it may be desirable to couple a fluid pathway from a piece of processing equipment to another fluid pathway from a secondary piece of processing equipment container while maintaining a sterile pathway for fluid flow.

Many types of aseptic coupling exist that include two coupling portions that can be attached and detached from one another. However, most such couplies are fairly complex or result in excessive fluid existing between the two disconnected coupling portions which can result in inadvertent exposure to the surrounding environment. In order to minimize any such fluid, it is typically necessary to add a clamping device upstream of the aseptic coupling to close off the flow through the aseptic coupling before separation.

A need exists for an improved aseptic coupling system.

SUMMARY OF THE INVENTION

An aseptic closure system is disclosed for attaching to a container. In an embodiment, the closure system includes an upper section and a lower section, where at least one of either the upper section or the lower section includes a mounting component for removably attaching the upper section to the lower section. The upper section has an upper valve housing with at least one inlet port and at least one outlet port. The inlet port and the outlet port each include a conduit that permits fluid communication through the port with an interior of the upper valve housing. Each port is configured to fluidly communicate with at least one component of which it is desired to maintain an aseptic connection.

The lower section includes a top deck with an attachment mechanism located on a lower portion of the top deck for engaging with a top of the container. A lower valve housing is formed on and extends upward from an upper surface of the top deck. The lower valve housing includes two conduits that permit fluid communication through the lower valve housing to an interior of the lower section.

An upper rotary valve is mounted to the upper valve housing and configured to rotate relative to the upper valve housing. The upper rotary valve includes a cylindrical upper valve shaft that is rotatable within an upper bore extending through the upper valve housing. Two upper shaft conduits extend through the upper valve shaft and are positioned such that, when the upper rotary valve is in an open state, the upper valve shaft conduits align with the inlet port and outlet port conduits and the lower valve housing conduits, thereby permitting fluid communication between the upper section and the lower valve housing.

The upper rotary valve has a closed state wherein the upper valve shaft is rotated relative to the upper valve housing such that the upper shaft conduits are not aligned with the inlet port and outlet port conduits and the lower valve housing conduits, and fluid communication between the upper section and the lower valve housing is prohibited by the upper valve shaft.

A lower rotary valve is mounted to the lower valve housing and is configured to rotate relative to the lower valve housing. The lower rotary valve includes a cylindrical lower valve shaft that is rotatable within a lower bore extending through the lower valve housing, and includes two lower shaft conduits that extend through the lower rotary valve shaft. The two lower shaft conduits are located such that, when the lower rotary valve is in an open state, the lower shaft conduits align with the lower valve housing conduits and, if the upper rotary valve is in its open state, fluid communication is permitted between the upper section and the lower section.

The lower rotary valve has a closed state where the lower valve shaft is rotated relative to the lower valve housing such that the lower shaft conduits are not aligned with the lower valve housing conduits, and fluid communication between the upper section and the lower section is prohibited by the lower valve shaft.

In one embodiment, the mounting component is a mounting bracket on the upper valve housing and extending downward from a base of the upper valve housing. The mounting bracket includes four walls that fit snuggly around an external surface of the lower valve housing so as to enclose a portion of the lower valve housing within the walls.

The mounting bracket may include two open apertures on opposite sides of the bracket that snap onto ends of the lower valve shaft where the lower valve shaft extends out of either side of the bore of the lower valve housing, thereby removably securing the upper section to the lower section.

The upper valve housing may include an extension that extends downward from a lower end of each of the inlet port conduit and outlet port conduit. Each extension engages with an upper end of an opening corresponding one of the lower valve housing conduits. Each extension and opening preferably has a tapered interface that provides a press fit connection with one another to facilitate an aseptic connection between the upper valve housing and the lower valve housing.

The inlet port, outlet port and the upper valve housing are preferably formed as an integral component.

The inlet port and outlet port may include hose barbs for connecting with tubing.

In an embodiment the at least one component is selected from a fluid media bag, a secondary container, or processing equipment.

The lower section may include a skirt and the attachment mechanism preferably includes threads formed on an internal surface of the skirt that are configured to removably engage with mating threads on the container.

The upper valve shaft preferably includes a tab formed on one end that can be grasped by a user for rotating the upper rotary valve relative to the upper valve housing between its open and closed states. The lower valve shaft preferably includes a tab formed on one end of the lower valve shaft that can be grasped by a user for rotating the lower rotary valve relative to the lower valve housing between its open and closed states.

The upper valve housing may include first and second stops for interacting with the tabs. The first stop is located so as to limit the rotation of the tab on the upper valve shaft such that when the tab contacts the first stop the upper rotary valve is preferably in its closed state. The second stop is located so that when the tab on the lower valve shaft contacts the lower stop the lower rotary valve is preferably in its open state. The first and second stops and the tabs may be arranged such that the lower rotary valve cannot be rotated to is closed state until the upper rotary valve is first rotated to its closed state.

In an embodiment, the lower rotary valve is connected to the upper valve housing.

In an embodiment, an aseptic closure system is provided for attaching to a container. The closure system includes an upper section and a lower section, where at least one of either the upper section or the lower section includes a mounting bracket for removably attaching the upper section to the lower section.

The upper section includes an upper valve housing with at least one inlet port and at least one outlet port, each port including a conduit that permits fluid communication through the port with an interior of the upper valve housing. Each port is configured to fluidly communicate with at least one component of which it is desired to maintain an aseptic connection.

The lower section includes a top deck with an attachment mechanism located on a lower portion of the top deck for engaging with a top of the container. A lower valve housing is formed on and extends upward from an upper surface of the top deck. The lower valve housing includes two conduits that permit fluid communication through the lower valve housing to an interior of the lower section.

An upper rotary valve is mounted to the upper valve housing and configured to rotate relative to the upper valve housing. The upper rotary valve includes a cylindrical upper valve shaft that is rotatable within an upper bore extending through the upper valve housing. Two upper shaft conduits extend through the upper valve shaft and are positioned such that, when the upper rotary valve is in an open state, the upper valve shaft conduits align with the inlet port and outlet port conduits and the lower valve housing conduits, thereby permitting fluid communication between the upper section and the lower valve housing.

The upper rotary valve has a closed state where the upper valve shaft is rotated relative to the upper valve housing such that the upper shaft conduits are not aligned with the inlet port and outlet port conduits and the lower valve housing conduits, and fluid communication between the upper section and the lower valve housing is prohibited by the upper valve shaft.

A lower rotary valve is mounted to the lower valve housing and is configured to rotate relative to the lower valve housing. The lower rotary valve includes a cylindrical lower valve shaft that is rotatable within a lower bore extending through the lower valve housing. Two lower shaft conduits extend through the lower rotary valve shaft and are located such that, when the lower rotary valve is in an open state, the lower shaft conduits align with the lower valve housing conduits and, if the upper rotary valve is in its open state, fluid communication is permitted between the upper section and the lower section.

The lower rotary valve has a closed state where the lower valve shaft is rotated relative to the lower valve housing such that the lower shaft conduits are not aligned with the lower valve housing conduits, and fluid communication between the upper section and the lower section is prohibited by the lower valve shaft.

The mounting bracket removably connects the upper valve housing to the lower valve housing. The mounting bracket extends either downward from a lower portion of the upper valve housing or upward from an upper portion of the lower valve housing.

The upper valve shaft includes a tab formed on one end that can be grasped by a user for rotating the upper rotary valve relative to the upper valve housing between its open and closed states. The lower valve shaft includes a tab formed on one end of the lower valve shaft that can be grasped by a user for rotating the lower rotary valve relative to the lower valve housing between its open and closed states.

Preferably the mounting bracket includes four walls that snuggly engage an external surface of the lower valve housing so as to enclose a portion of the lower valve housing within the walls. The mounting bracket preferably includes two open apertures on opposite sides of the bracket that snap onto ends of the lower valve shaft where the lower valve shaft extents out of either side of the bore of the lower valve housing, thereby removably securing the upper section to the lower section.

The foregoing and other features of the invention and advantages of the present invention will become more apparent in light of the following detailed description of the preferred embodiments, as illustrated in the accompanying drawings. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there are shown in the drawings embodiments that are presently preferred; it being understood, however, that this invention is not limited to the precise arrangements and constructions particularly shown.

FIG. 2 is an isometric view of the embodiment of the cap of FIG. 1 in its closed state.

FIG. 2A is a front view of the cap of FIG. 2.

FIG. 2B is a top view of the cap of FIG. 2.

DESCRIPTION OF THE EMBODIMENTS

Figure 1:
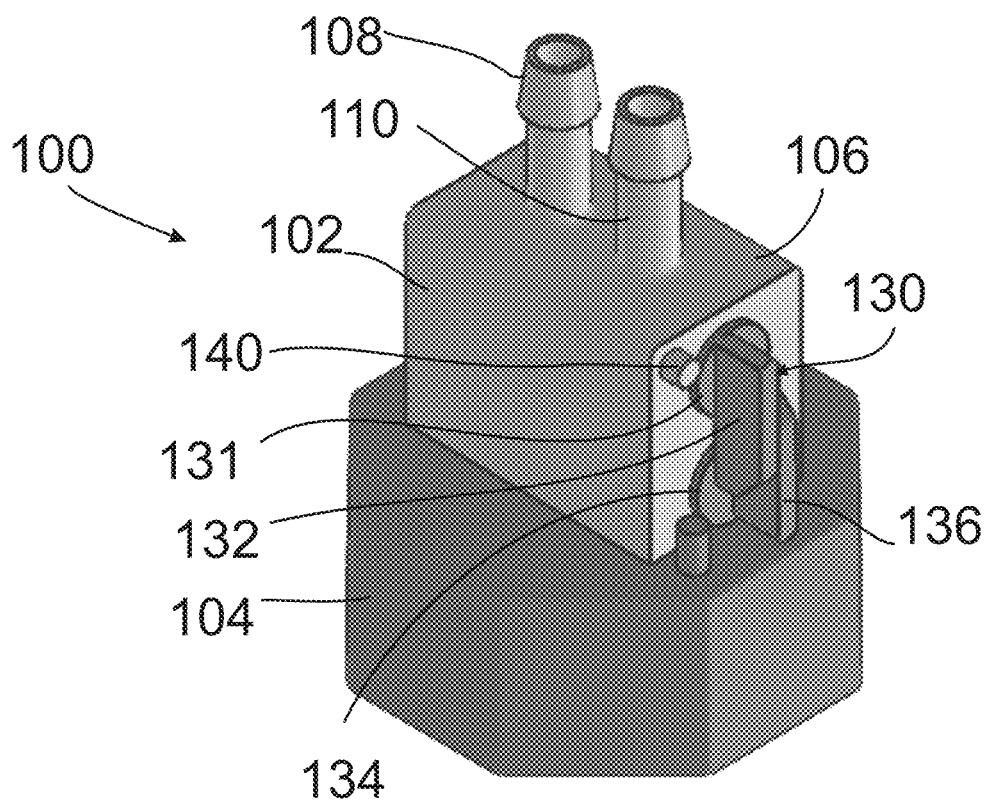
FIG. 1 is an isometric view of a cap with a dual valve aseptic seal according to an embodiment of the invention in its open state.
Figure 1A:
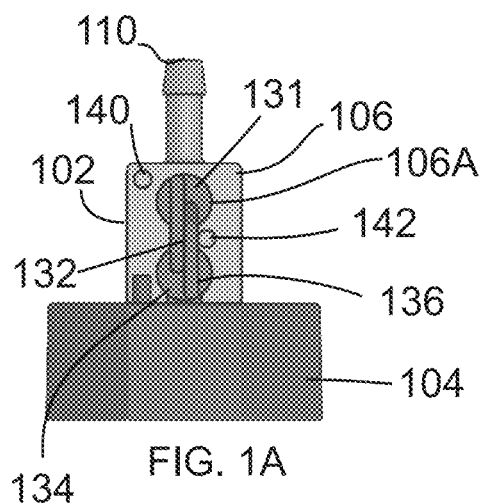
FIG. 1A is a front view of the cap of FIG. 1.
Figure 1B:
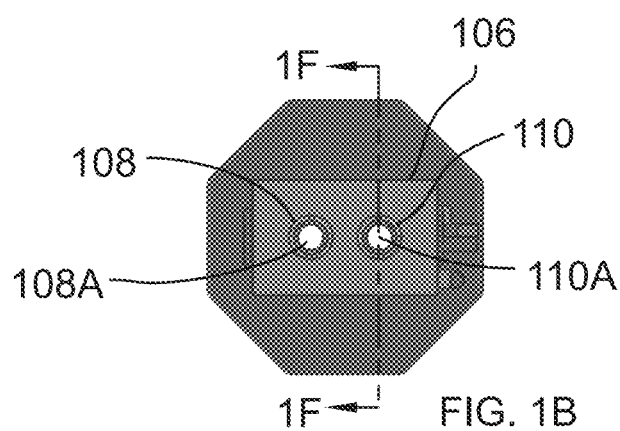
FIG. 1B is a top view of the cap of FIG. 1.
Figure 1C:
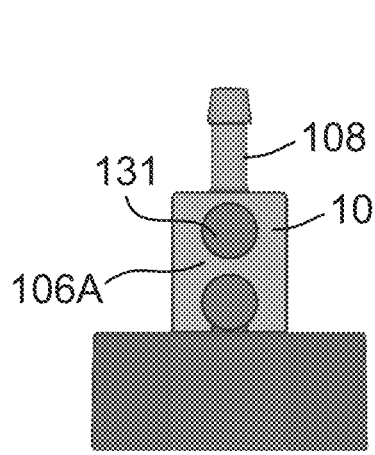
FIG. 1C is a rear view of the cap of FIG. 1.
Figure 1D:
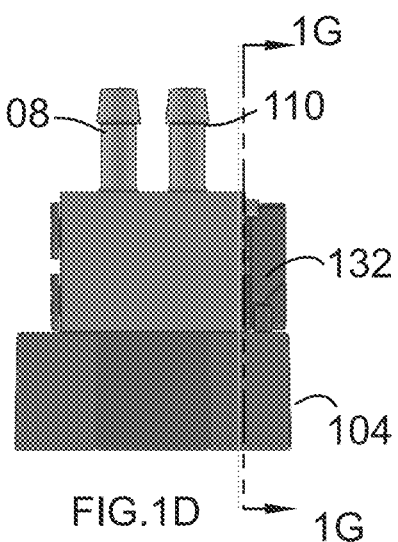
FIG. 1D is a side view of the cap of FIG. 1.
Figure 1E:
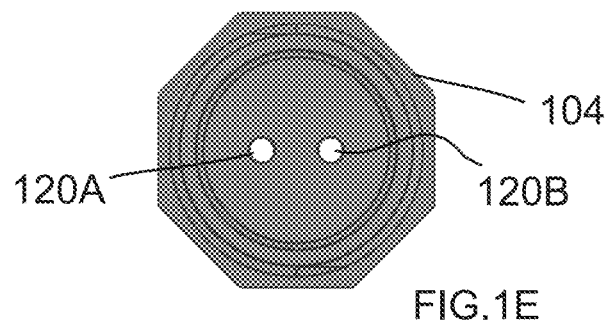
FIG. 1E is a bottom view of the cap of FIG. 1.
Figure 1F:
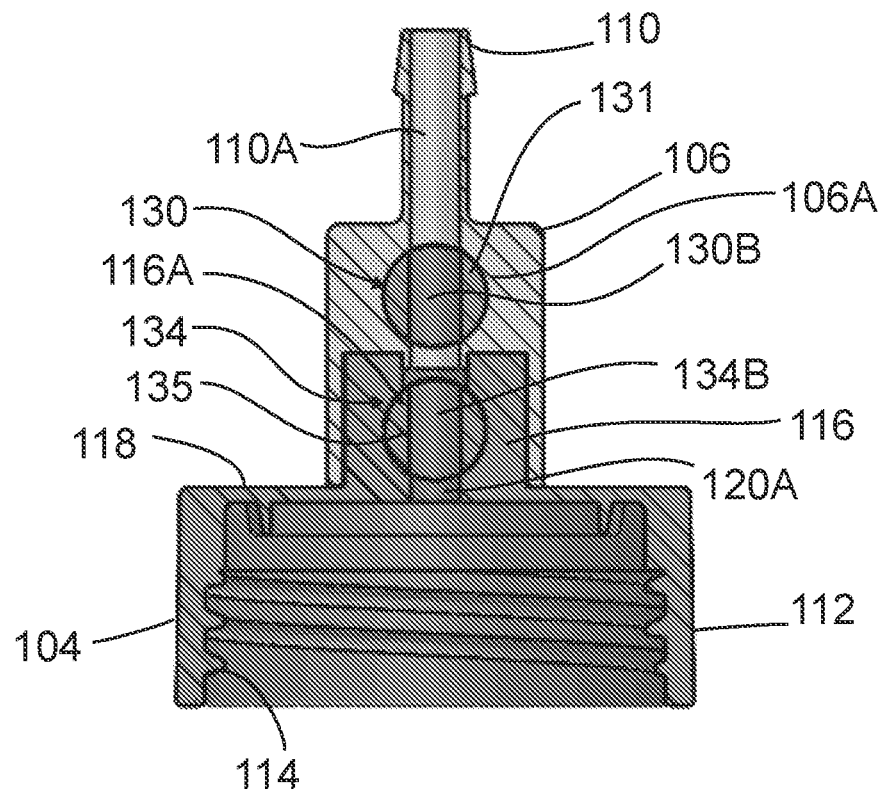
FIG. 1F is a section view of the cap of FIG. 1 taken along lined 1F-1F in FIG. 1B.
Figure 1G:
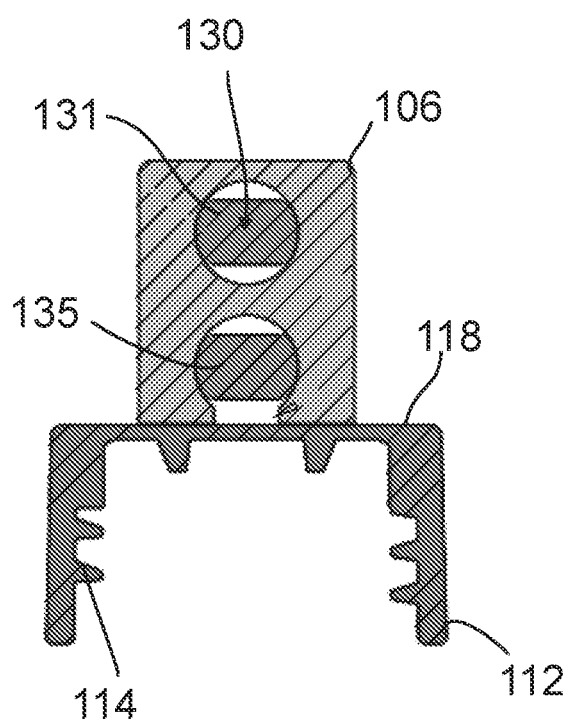
FIG. 1G is a section view of the cap of FIG. 1 taken along lined 1G-1G in FIG. 1D.
Figure 2C:
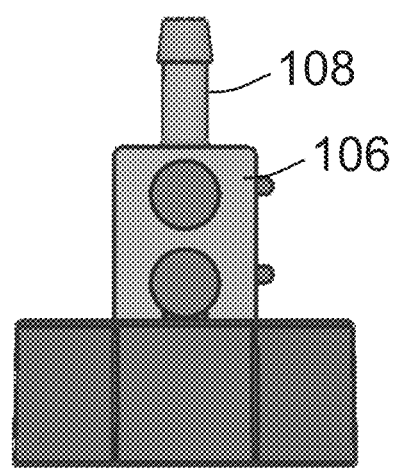
FIG. 2C is a rear view of the cap of FIG. 2.
Figure 2D:
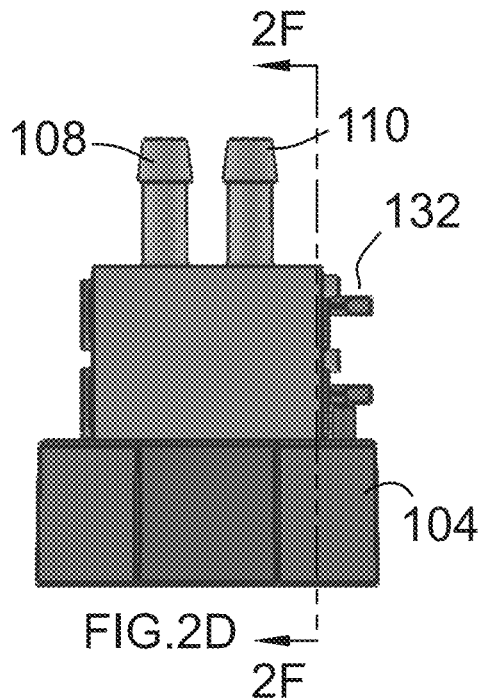
FIG. 2D is a side view of the cap of FIG. 2.
Figure 2E:
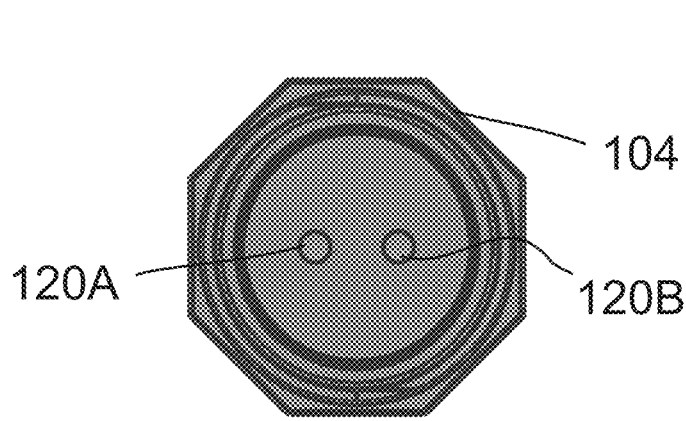
FIG. 2E is a bottom view of the cap of FIG. 2.
Figure 2F:
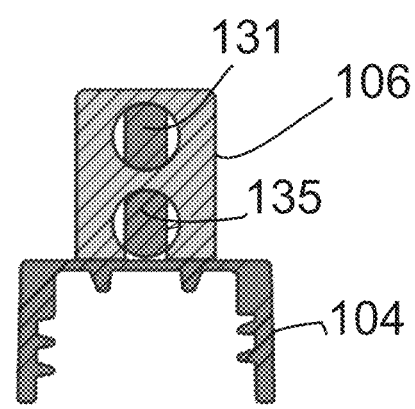
FIG. 2F is a section view of the cap of FIG. 2 taken along lined 2F-2F in FIG. 2D.

The present invention is directed to a cap or closure system for use on a bottle or other container that requires aseptic connections, the closure system includes mechanical action seals which, when closed, provide an aseptic seal through use of movable components, such as rotary, sliding or plug seals.

Referring to FIGS. 1, and 1A-1G, an embodiment of a closure system for a cap with aseptic seals is illustrated. The closure system 100 includes an upper section 102 and a lower section 104. As will be discussed in more detail below, the upper section 102 is removably attached to the lower section 104 as will be described in more detail below.

The upper section 102 includes an upper valve housing 106, at least one inlet port 108 and at least one outlet port 110. The inlet port 108 and the outlet port 110 each include a conduit 108A, 110A that permits fluid communication through the port with an interior of the upper valve housing 106. The inlet port 108, outlet port 110 and the upper valve housing 106 are preferably formed as an integral component, although they could be separate components that are attached to one another. In the illustrated embodiment, the inlet port 108 and outlet port 110 are shown as hose barbs. However, it is contemplated that other connectors that are commonly used in bioprocessing (e.g., luer fittings, tri-clamps, etc.) can be integrated into the upper section 102. Each port 108, 110 is configured to connect, attach, or fluidly communicate with at least one component of which it is desired to maintain sterility and/or reduce or minimize contamination from external or environmental sources. The component may be a fluid media bag or container, for example a biofluid, chemical or medical fluid container, or processing equipment, for example, a bioreactor or biofluid pump, or to tubing connecting to any of the foregoing. For example, a tube could have one end connected to one of the barbed fittings and its other end connected to processing equipment.

The lower section 104 includes a skirt 112 and an attachment mechanism for engaging with the top of a container. Preferably the lower section includes internal threads 114 as the attachment mechanism that removably engage with mating threads on the applicable container. However, it is also contemplated that the lower section could snap onto a container neck. The lower section 104 includes a lower valve housing 116 formed on and extending upward from a top deck 118 on the lower section 104. As will be discussed in more detail below, the lower valve housing 116 connects with the upper valve housing 106. The lower valve housing 116 includes two conduits 120A, 1206 that permit fluid communication through the lower valve housing 116 to an interior of the lower section 104.

The upper section 102 includes an upper rotary valve 130 that is mounted to the upper valve housing 106 and configured to rotate relative to the upper valve housing 106. The upper rotary valve 130 includes a preferably cylindrical valve shaft 131 that is rotatable within an upper bore 106A extending through the upper valve housing 106. The upper valve shaft 131 preferably fits tightly within the bore 106A so as to provide a rotary seal. The upper rotary valve 130 includes two conduits 130A, 1306 (FIG. 1F) that extend through the upper valve shaft 131 and are positioned such that, when the upper rotary valve 130 is in its open state, the conduits 130A and 130B align with the conduits 108A, 110A in the inlet and outlet ports and the conduits 120A, 1206 in the lower valve housing 116, thereby permitting fluid communication between the upper section 102 and the lower valve housing 116. The upper rotary valve 130 has a closed state wherein the upper valve shaft 131 is rotated relative to the upper valve housing 106 such that the conduits 130A and 1306 are not aligned with the conduits 108A, 110A in the inlet and outlet ports and the conduits 120A, 1206 in the lower valve housing 116. In the closed state, fluid communication between the upper section 102 and the lower valve housing 116A is prohibited by the upper valve shaft 131. The closed state is shown in FIGS. 2, 2A-2F. A tab 132 is formed on one end of the upper valve shaft 131 that can be grasped by a user for rotating the upper rotary valve 130 relative to the upper valve housing 106 between its open and closed states.

Figure 3A:
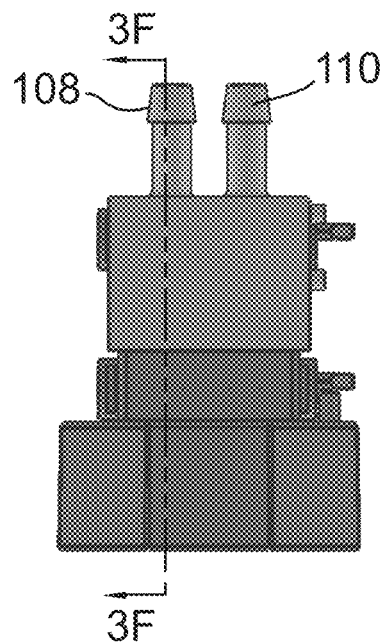
FIG. 3A is a side view of the cap of FIG. 2 with the upper section shown separated from the lower section.
Figure 3B:
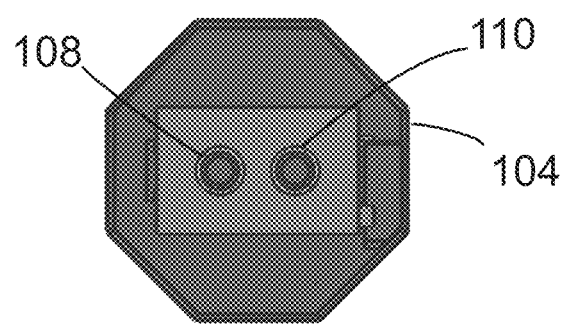
FIG. 3B is a top view of the separate cap sections of FIG. 3A.
Figure 3C:
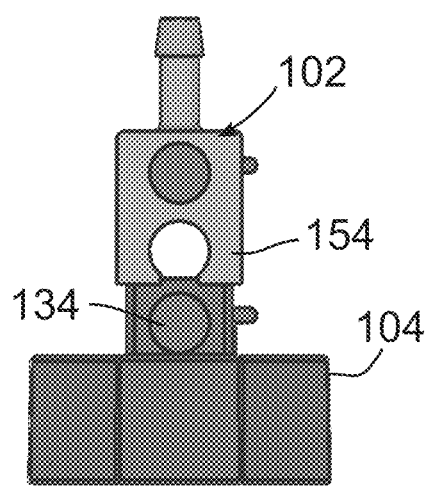
FIG. 3C is a rear view of the separate cap sections of FIG. 3A.
Figure 3D:
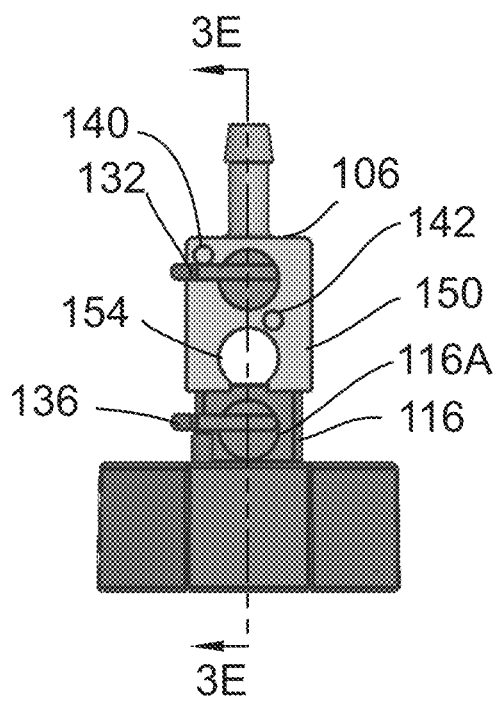
FIG. 3D is a front view of the separate cap sections of FIG. 3A.
Figure 3E:
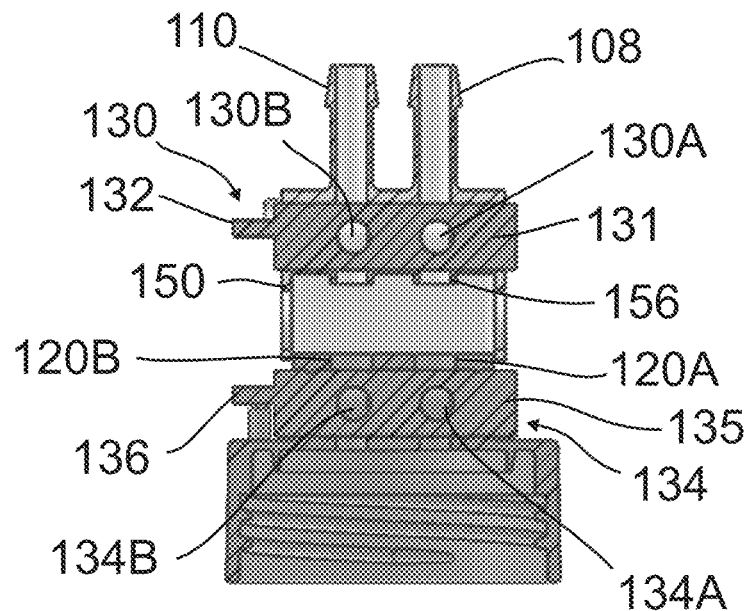
FIG. 3E is a section view of the separate cap sections of FIG. 3A taken along lines 3E-3E in FIG. 3D.
Figure 3F:
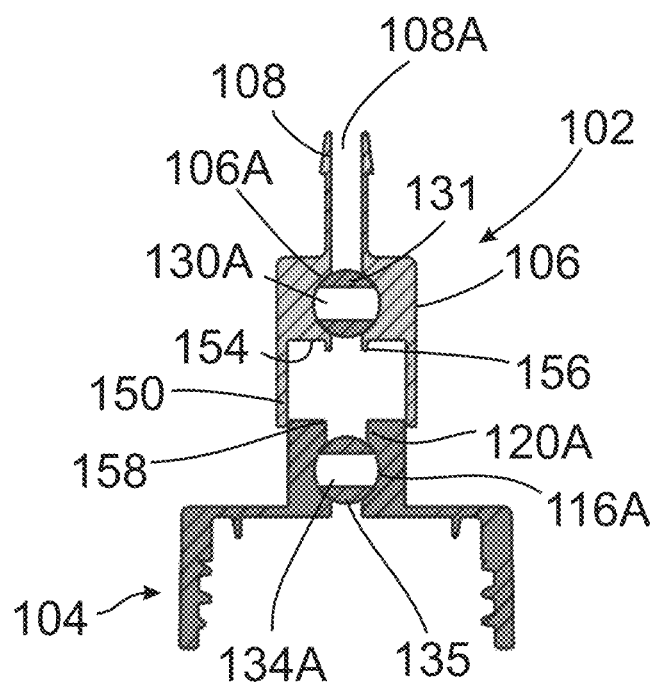
FIG. 3F is a section view of the separate cap sections of FIG. 3A taken along lines 3F-3F in FIG. 3A.
Figure 4:
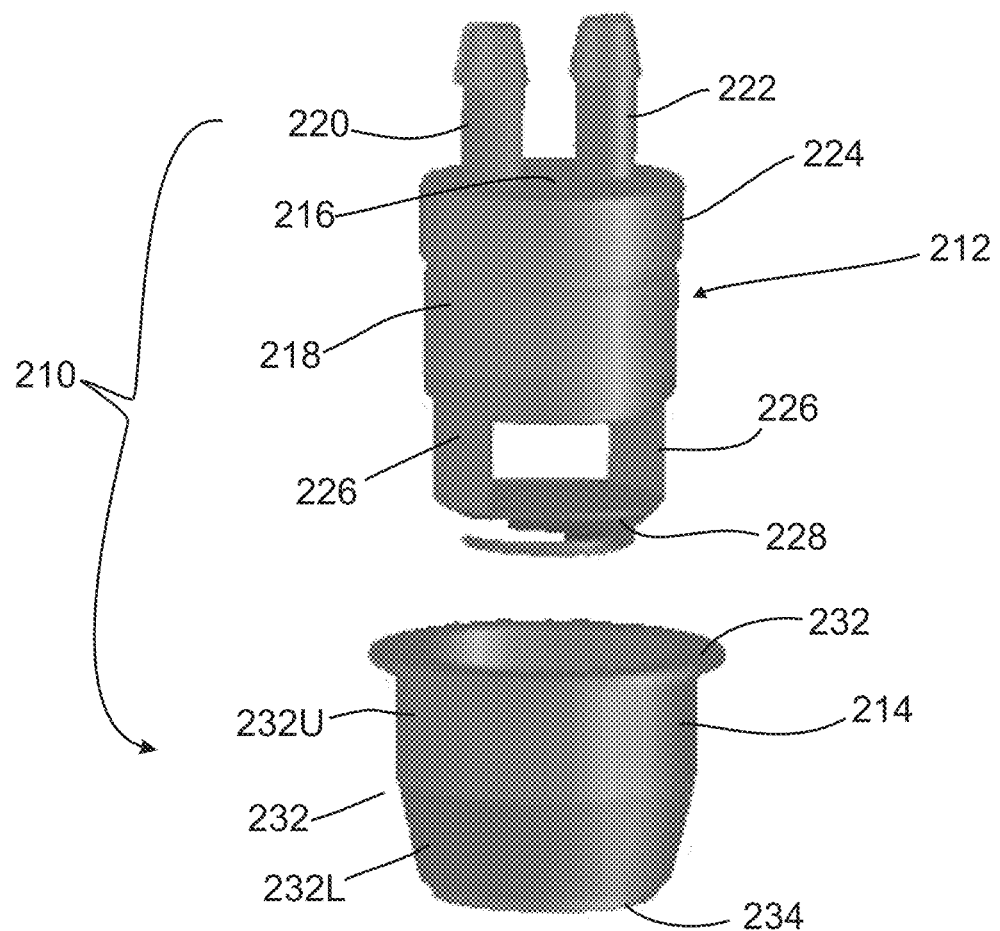
FIG. 4 is an exploded view of another embodiment of a cap with a dual aseptic seal that includes plug seals.
Figure 5A:
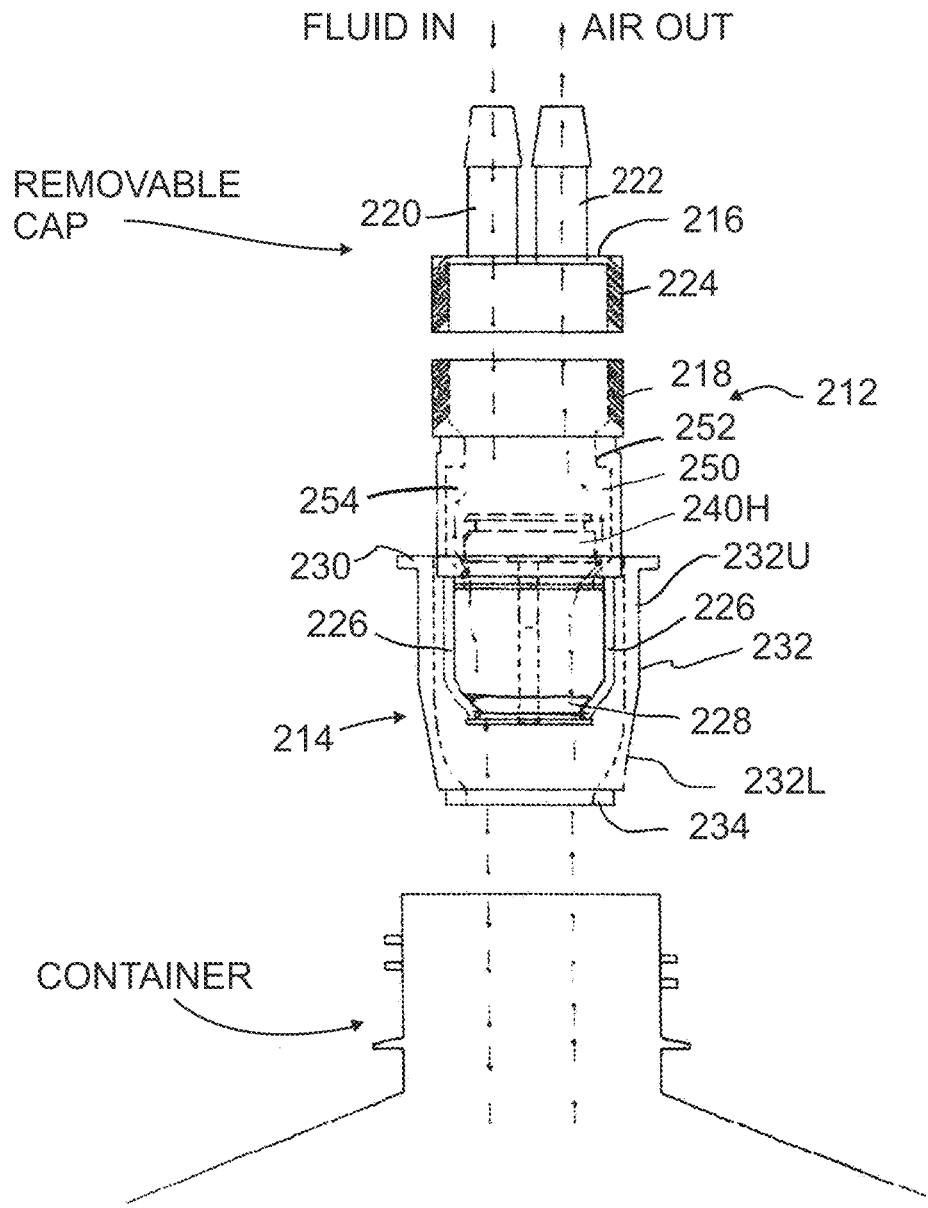
FIG. 5A is a section view of the cap of FIG. 4 in its open state schematically arranged with a container and the cap.
Figure 5B:
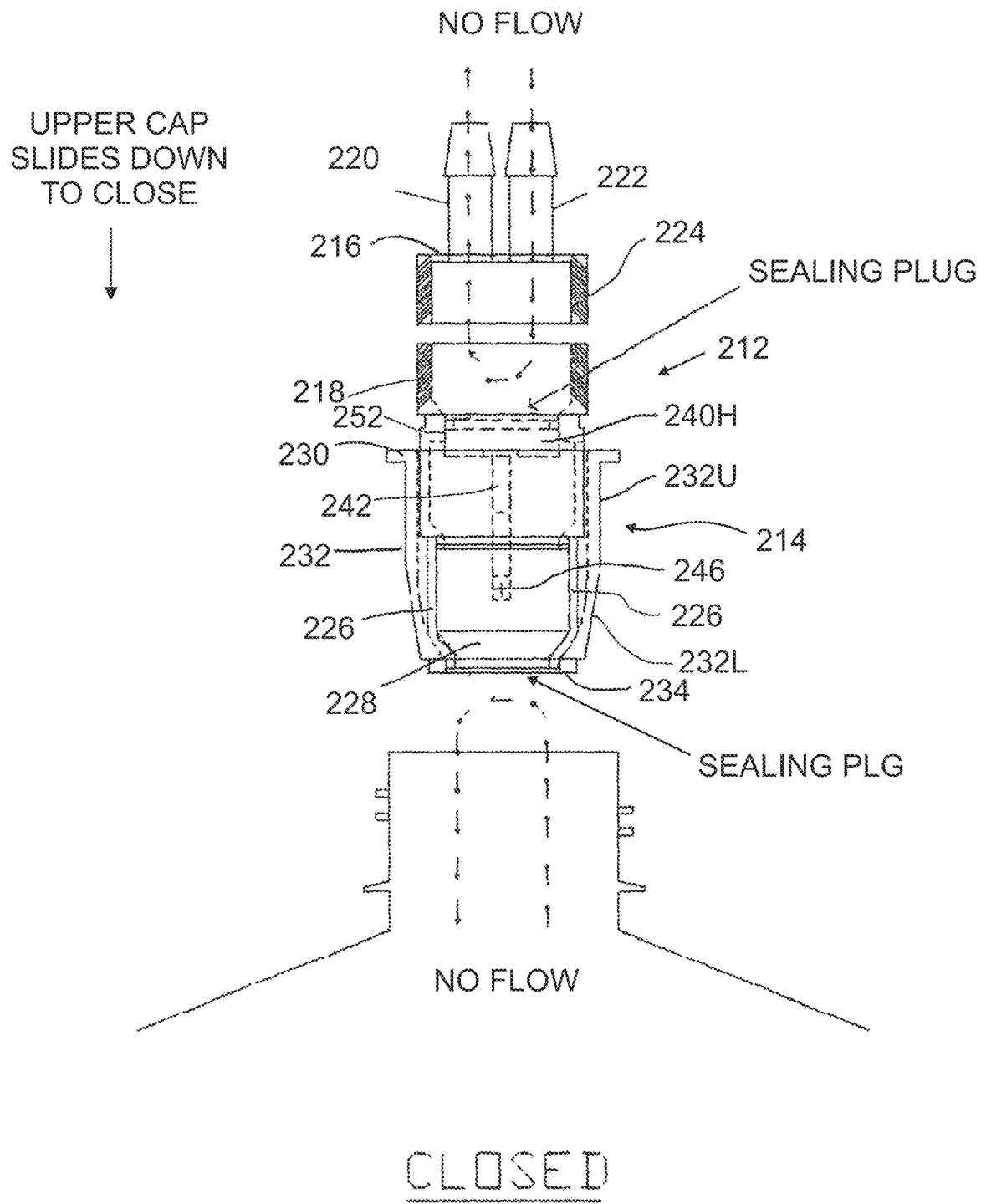
FIG. 5B is a section view of the cap of FIG. 4 in its closed state schematically arranged with a container and the cap.
Figure 6:
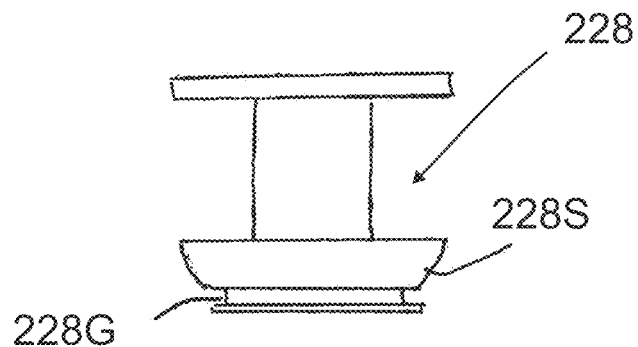
FIG. 6 illustrates the lower plus seal separated from the remainder of the body portion.

The lower valve housing 116 includes a lower rotary valve 134 that is mounted to the lower valve housing 116 and is preferably connected to the upper valve housing as discussed in more detail below. The lower rotary valve is configured to rotate relative to the lower valve housing 106. The lower rotary valve 134 includes a preferably cylindrical valve shaft 135 that is rotatable within a lower bore 116A extending through the lower valve housing 116. The lower valve shaft 135 preferably fits tightly within the bore 116A so as to provide a rotary seal. The lower rotary valve 134 includes two conduits 134A, 1346 (FIGS. 1E and 3E) that extend through the rotary valve shaft 135 and are located such that, when the lower rotary valve is in its open state, the conduits 134A and 134B align with the conduits 120A, 1206 in the lower valve housing 116 and, if the upper rotary valve 103 is in its open state, the conduits in the 103A, 130B in the upper rotary valve 130 permit fluid communication between the upper section 102 and the lower section 104. The lower valve 134 has a closed state wherein the lower valve shaft 135 is rotated relative to the lower valve housing 116 such that the conduits 134A and 1346 are not aligned with the conduits 120A, 1206 in the lower valve housing 116. In the closed state, fluid communication between the upper section 102 and the lower section 104 is prohibited by the lower valve shaft 135. The closed state of the lower rotary valve 134 is shown in FIGS. 2, 2A-2F. A tab 136 is formed on one end of the lower valve shaft 135 that can be grasped by a user for rotating the lower rotary valve 134 relative to the lower valve housing 116 between its open and closed states.

The upper valve housing 106 preferably includes first and second stops 140, 142. The stops 140, 142 are configured to interact with the tabs 132, 136. More specifically, the first stop 140 is located so as to limit the rotation of the tab 132 on the upper rotary valve 130. When the upper tab 132 contacts the first stop 140, the tab is preferably in a horizontal position and the upper rotary valve 130 is in its closed state. Similarly, the second stop 136 is located so that that lower tab 136 contacts the lower stop 142 when the lower rotary valve 134 is in its open state (the lower tab 136 is vertically oriented). Furthermore, the stops 140, 142 and the tabs are arranged such that the lower rotary valve 134 cannot be rotated to is closed state until the upper rotary valve 130 is first rotated to its closed state. This is designed to maintain an aseptic environment for the contents of the containers and whatever is connected to the ports.

Referring to FIGS. 3A-3F, the closure system 100 is shown with the upper section 102 separated from the lower section 104. More specifically, as discussed above the upper valve housing 106 is shown detached from the lower valve housing 126. In the illustrated embodiment, the upper valve housing 106 includes a mounting bracket 150 that extends downward from a base 152 of the upper valve housing 106. The mounting bracket 150 preferably has four walls that fit snuggly around the external surface of the lower valve housing 116 so as to enclose the lower valve housing within the walls. The mounting bracket 150 preferably includes two open apertures 154 on opposite sides of the bracket 150 that snap onto ends of the lower valve shaft 135 where it extents out of either side of the bore 116A of the lower valve housing 116, thus removably securing the upper section 102 to the lower section 104. In the illustrated embodiment, the mounting bracket 150 is an integral extension of the upper valve housing 106.

The upper valve housing 106 preferably includes an extension 156 that extends downward from the base 154 around the lower end of each conduit 108A, 110A. Each extension 156 engages with an upper end of an opening 158 of a corresponding one of the conduits 120A, 1206 in the lower valve housing 116. Each extension 156 and opening 158 preferably has a tapered interface that provide a press fit connection with one another to facilitate an aseptic connection between the upper valve housing 106 and the lower valve housing 116.

As shown, when the upper and lower valves 130, 134, are in their closed states, the upper section 106 and lower section 116 can be separated from one another while keeping each section aseptically sealed. It should be readily apparent that the mounting of the upper section 106 to the lower section 116 can be reversed or could include other mounting components.

The present invention permits the aseptic sealing and separation of a supply container after use, those permitting the supply container to be stored such as in a freezer for later use.

Vertical Linear Sealing Closure

Referring to FIGS. 4-7, a second embodiment of a closure system for a cap with dual aseptic seals is illustrated. The closure system 210 includes an upper cap 212 and a lower cap 214. The upper cap 212 is configured to fit into and translate vertically relative to the lower cap 214 as will be described in more detail below.

The upper cap 212 includes a top 216 with body portion 218 attached to or integrally formed with the top and extending downward therefrom. The combination of the top 216 and the body portion 218 define an interior. The top 216 includes at least one inlet 220 and one outlet 222 which each communicate with the interior. The inlet 220, outlet 222 and top are preferably incorporated into an interchangeable cover cap 224 that threads onto or otherwise is removably attached to the body portion 218. In the illustrated embodiment, the inlet 220 and outlet 222 are shown as hose barbs. However, it is contemplated that other connectors that are commonly used in bioprocessing (e.g., luer fittings, tri-clamps, etc.) can be integrated into the cap 224. The use of a removable cap 224 permits the use of a wide range of connections with the same core componentry of the closure system. The bottom of the body portion 218 includes two extensions 226 that extend downward to a first or lower plug seal 228.

Figure 7:
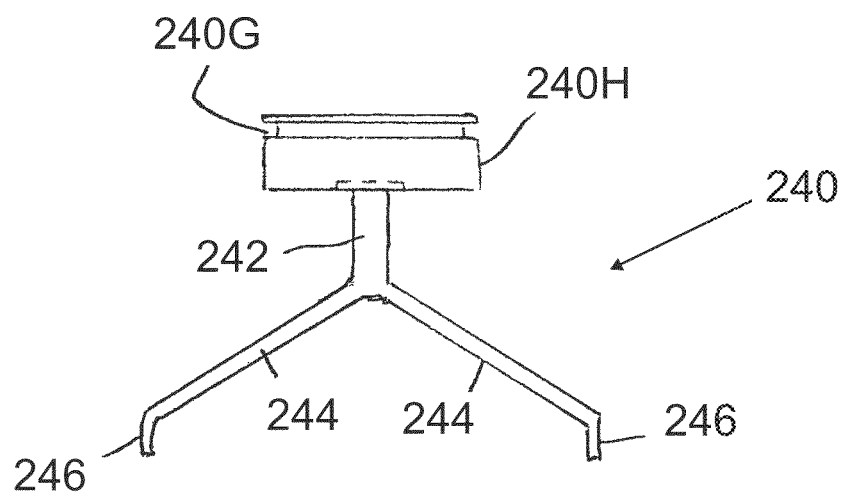
FIG. 7 illustrates the upper plug seal separated from the remainder of the body portion.

The lower plug seal 228 is shown in more detail in FIG. 7 separated from the remainder of the body portion 218. The lower plug seal 228 includes a preferably tapered seat 228S that preferably includes a groove 228G in which a rubber or elastomer O-ring (not shown) sits.

The lower cap 214 has an annular rim 230 configured to seat on the top of the neck of a container during use. A sidewall 232 extends downward from the rim 230 and includes a generally cylindrical upper sidewall 232U and a tapered lower sidewall 232L. The bottom 234 of the lower sidewall 232L is open. The inside diameter of the upper sidewall 232U is sized so as to snugly but slidingly receive the body portion 218 so that the body portion 218 can slide along the inner surface of the upper sidewall 232U. The taper of the lower sidewall 232L is configured that its inner diameter and the bottom 234 is slightly smaller than the diameter of the seat 228S of the first plug seal 228. Thus, when the upper cap 212 is translated completely downward into the lower cap 214, the seat 228S and O-ring of the first plug seal 228 seals off the open bottom 234.

A second or upper plug seal 240 is attached to or seated within the lower cap 214 so that the second plug seal 240 is generally stationary as the upper cap 212 transitions between its open state (where the upper cap 212 is displaced upward relative to the lower cap 214) and closed state (where the upper cap 212 is displaced downward relative to the lower cap 214). The second plug seal 240 is shown in more detail in FIG. 7. The second plug seal 240 includes a plug head 240H which preferably includes a groove 240G within which an rubber or elastomer O-ring (not shown) is inserted. To secure or mount the second plug seal 240 to the lower cap 214, a support 242 is attached to and extends downward from the bottom of plug head 240H. At least two legs 244 angle radially outward and downward from the support 242 and have feet 246 that are positioned to contact the inner sidewall 232 which hold the second plug seal 240 in place within the lower cap 214.

The interior of the body portion 218 of the upper cap 212 includes a cavity 250 in which the second plug seal 240 is located when assembled. The cavity 250 includes an upper hole 252 with a diameter that is slightly larger than the diameter of the plug head 240H such that when the plug head 240H is situated inside the upper hole 252, the plug head 240H seals off the upper hole preventing or inhibiting the passage of air or liquid. The cavity has a main chamber 254 with a diameter that is larger than the diameter of the plug head 240H such that when the plug head 240H is situated inside the main chamber 254, the plug head 240H does not seal off the upper hole 252 and, thus, air and/or liquid is permitted to flow through the upper hole 252 past the second plug seal 240 and through the open bottom 234.

The closure system is designed to permit the contents of a container to remain isolated from the outside (ambient) environment while exchanging air and fluid through the threaded cap connections. The threaded cap connections are secured to tubing which connect to other componentry in an end user's bioprocessing system.

During use, the closure system is in its open position state when the upper cap 212 is displaced vertically upwards from the lower cap 214. In this state, the second plug seal 240 is located within the main chamber 254 of the body portion 218 and the first plug seal is spaced upward from the open bottom 234. Thus, in this state, the closure permits the flow of fluid and air simultaneously through a shared passageway in the upper cap 212 and lower cap 214. This allows for liquid filling and air displacement to take place at the same time and avoids pressurizing the container. That is, as fluid is injected through the inlet 220, it displaces air that is contained in the container, forces the air to flow up through the lower cap 214 and upper cap 212 and out through the outlet 222.

To close the closure, a user pushes downward on the upper cap 212 causing it to slide downward into the lower cap 214. The movement of the upper cap 212 downward results in the first plug seal transitioning downward to close off the open bottom 234. Since the second plug seal 240 is stationary, the movement of the upper cap 212 downward causes the body portion 218 to move downward relative to the lower cap 214 and the second plug seal 240 which moves the upper hole 252 of the cavity 250 downward until it surrounds and seals against the plug head 240H of the second plug seal 240, thereby closing off the upper hole 252. The closed state of the closure system isolates the product within the bottle separate from the fluid and air passageways, ambient environment and tubing connections.

Lateral Linear Action Aseptic Disconnect Cap

Figure 8:
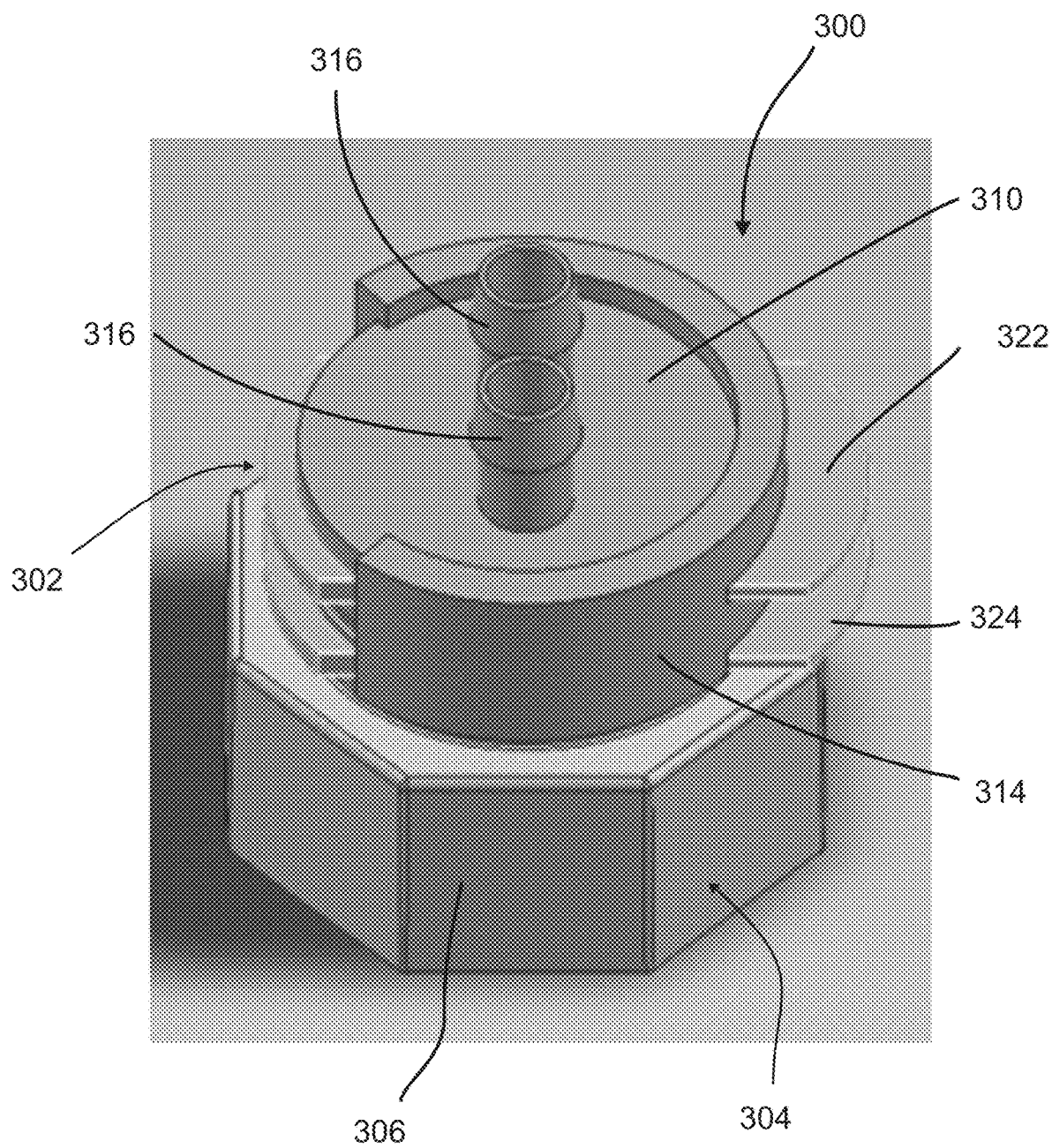
FIG. 8 illustrates an assembled view of a closure or cap assembly with an aseptic disconnect configuration according to another embodiment.
Figure 8A:
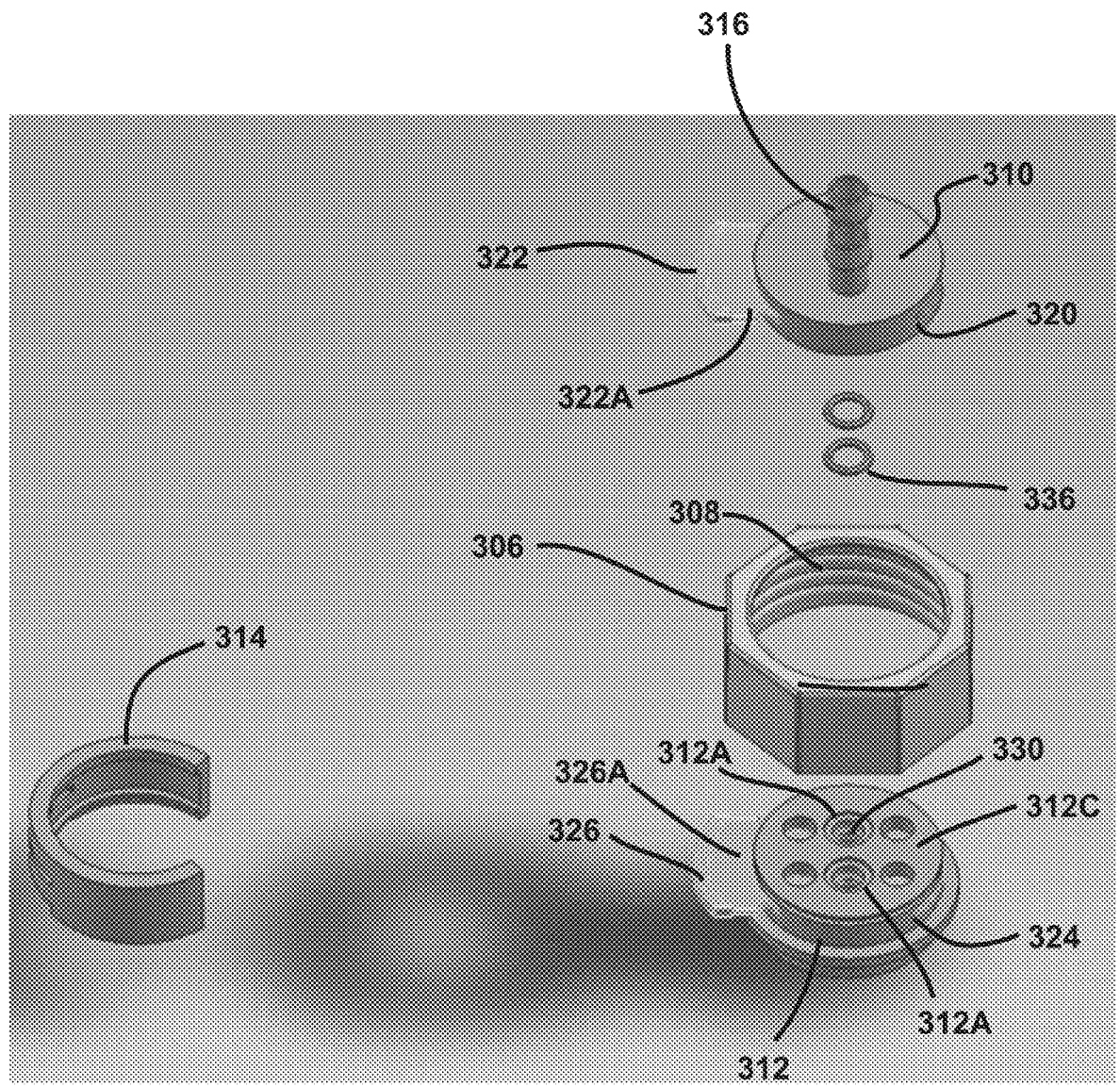
FIG. 8A is an exploded view of the cap assembly of FIG. 8.

Referring now to FIGS. 8 and 8A a second embodiment of a closure system 300 for a cap with dual plug aseptic seals is illustrated. FIG. 8 illustrates an assembled view of the closure or cap assembly 300 with an aseptic disconnect configuration. FIG. 8A is an exploded view of the cap assembly of FIG. 8. In this embodiment, the aseptic seal is provided by a laterally translatable linear mechanical action sealing assembly 302. The cap 304 includes an outer annular cap ring or skirt 306 with threads 308 or other conventional mechanisms on surface of the ring (preferably the inner surface) for connecting to the neck of a bottle (not shown).

The cap 304 includes an upper portion 310 and lower portion 312 that are secured to one another by a spring clip 314. The upper portion 310 includes a top surface with two ports 316 extending upwards from the top surface similar to the ports described above. The two ports 316 provide flow paths into the bottle. In a typical application in the bioprocess industry, tubing is connected to one of the ports 316 and the other port 316 is used to vent air or other gas from the bottle. The entire assembly 300 is made of conventional materials that permit sterilization via irradiation. This embodiment of the aseptic cap assembly allows a user to disconnect the upper portion 310 of the cap 304 from the lower portion 312 by sliding slide seals discussed below to aseptically separate the tubing and vent filter from the bottle, while still remaining container closure and integrity.

Figure 8B:
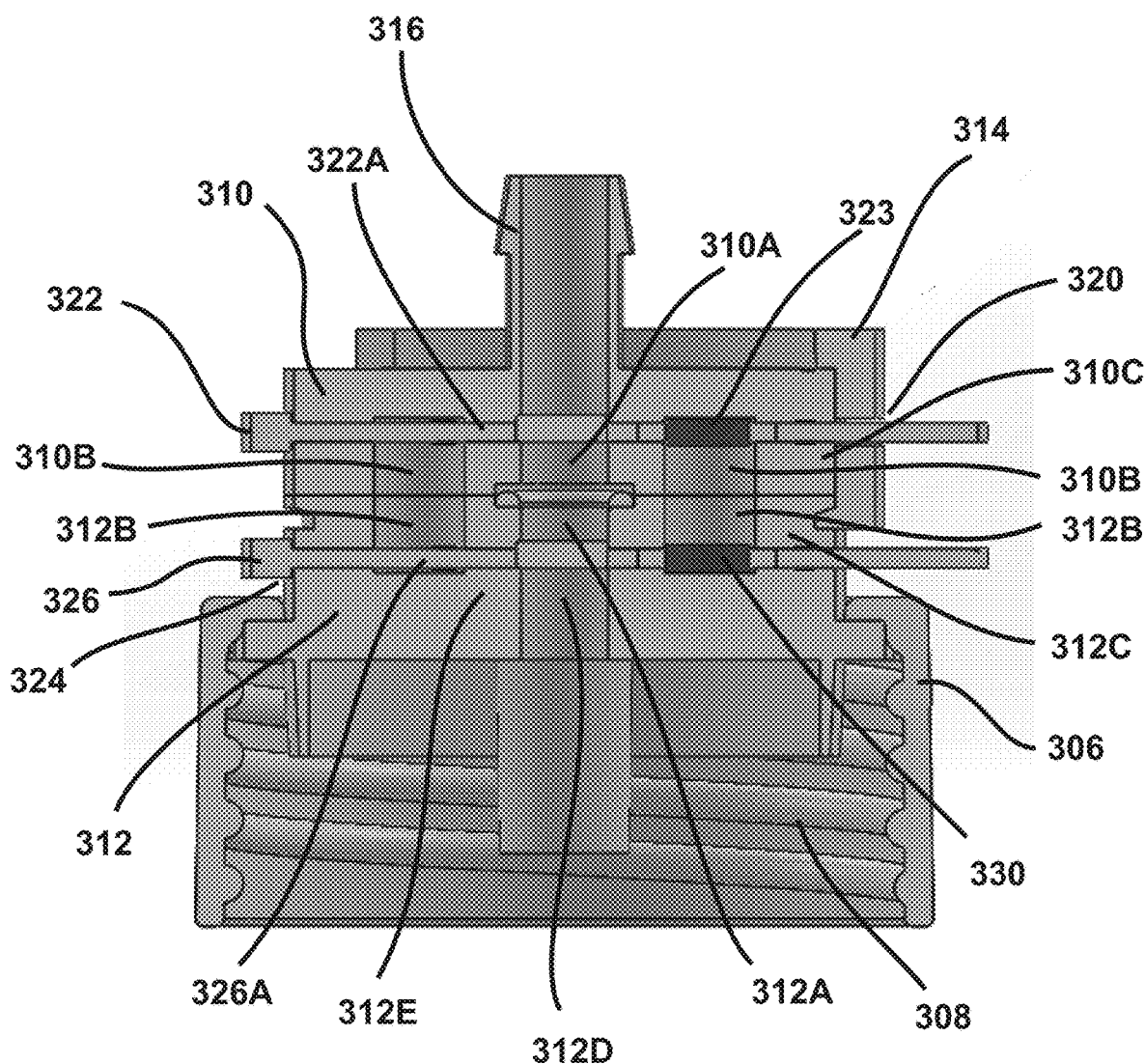
FIG. 8B is a cross-sectional view of the assembled view of FIG. 8.

As shown in FIGS. 8A and 8B, the upper portion 310 includes one slot 320 on either lateral side. An upper slide seal 322 extends through slots 320. The upper slide seal 322 and the slots 320 are configured such that the upper slide seal 322 slides laterally in the slots 320. The upper slide seal 322 includes a planar portion 322A in the center of the upper slide seal with two holes 323 (shown in FIG. 8B) formed through the planar portion that align with the ports 316 and with holes 310A formed on a bottom wall 310CA of the upper portion 310 that are aligned with the ports 316. The holes 310A on the upper portion 310 are similar to the holes in the lower portion described below. When the upper slide seal 322 is in its open position, the holes 323 in the upper slide seal 322 align with the ports 316 and the holes 310A in the upper portion thereby permitting flow between the ports 316 and the lower surface of the upper portion. When the upper slide seal 322 is slid into its closed position, the planar portion 322A of the upper slide seal 322 blocks the ports 316 and the holes 310A on the upper portion so as to prevent flow between the ports 316 and the lower surface of the upper portion 310.

The lower portion 312 also includes slots 324 on either lateral side and a lower slide seal 326 that extends through slots 324. The lower slide seal 326 and the slots 324 are configured such that the lower slide seal 326 slides laterally in the slots 324. The lower slide seal includes a planar portion 326A that has two holes 330 formed through it. The holes 330 are located such that they align with holes 312A formed in a top wall 312C of the lower portion 312 and aligned holes 312D in the bottom wall 312E. Elastomeric seal rings 336 are preferably inserted into annular recesses around the center holes 330 to provide a tight seal. While the illustrated embodiment shows multiple holes 312A, 312B formed in the top wall 334, only the center holes 312A are necessary. The additional side holes 312B are included to provide relief from compression forces acting on the elastomeric seal rings 336 when the slides are in the closed position. Instead of thru-holes 312B recesses could be used to provide the relief.

As shown in FIG. 8B, the lower portion 312 preferably has a flange that engaged with a rim on the cap ring 306, thereby securing the sealing assembly 302 to the cap ring 306.

By moving the upper and lower slide seals laterally flow through the ports can be controlled. When the ports 316 are sealed, the operator can then remove the spring clamp 314 and separate the upper portion 310 from the lower portion 312 while maintain an aseptic seal.

Rotating Action Aseptic Disconnect Cap

Figure 9:
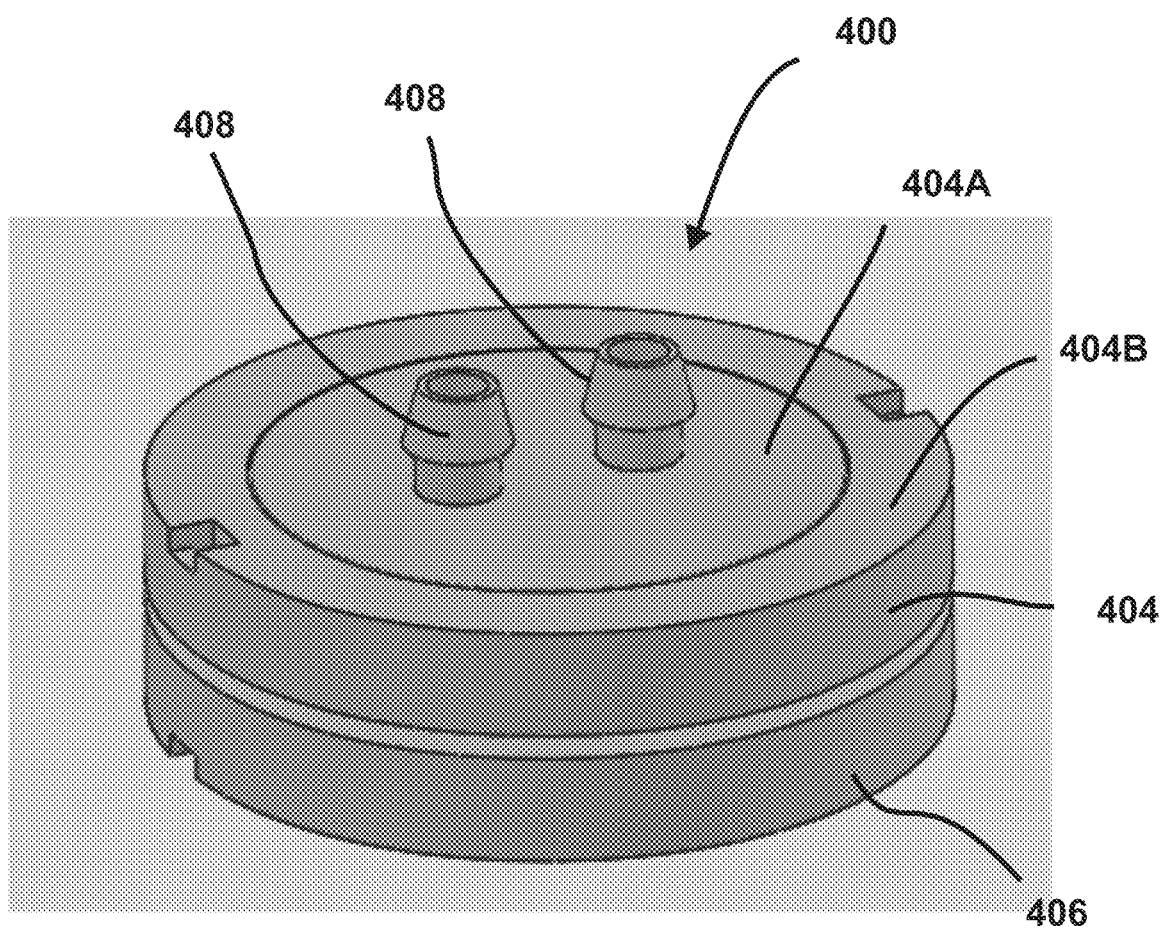
FIG. 9 is a perspective view of aseptic cap assembly according to another embodiment.
Figure 9A:
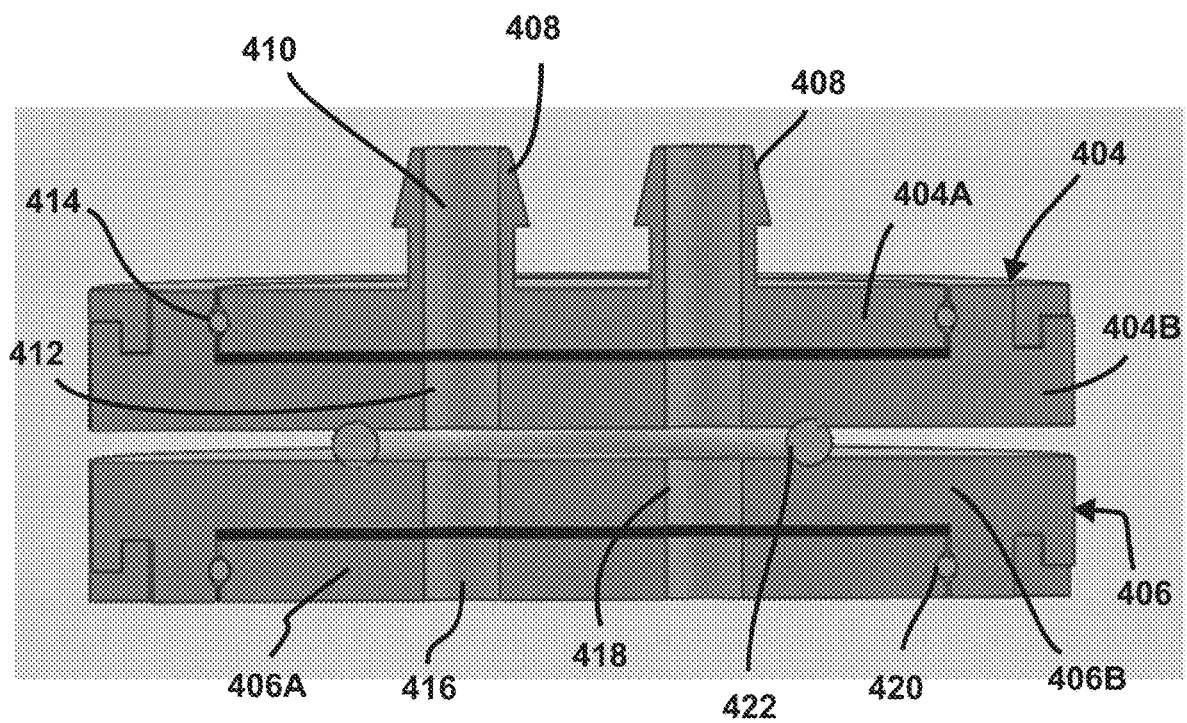
FIG. 9A is a cross-sectional view of the assembled view of FIG. 9.
Figure 9B:
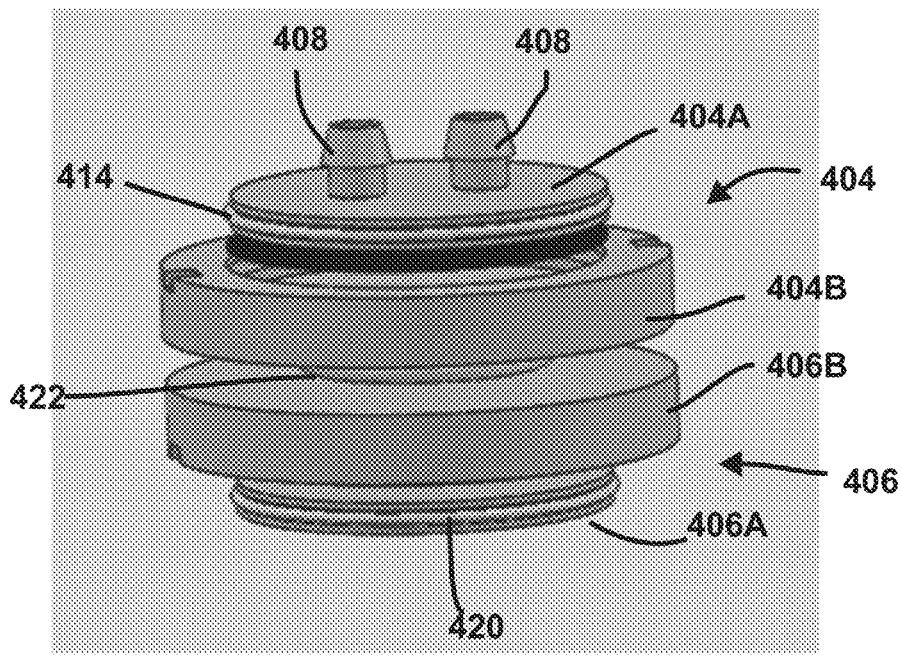
FIG. 9B is an exploded view of the cap assembly of FIG. 9.
Figure 9C:
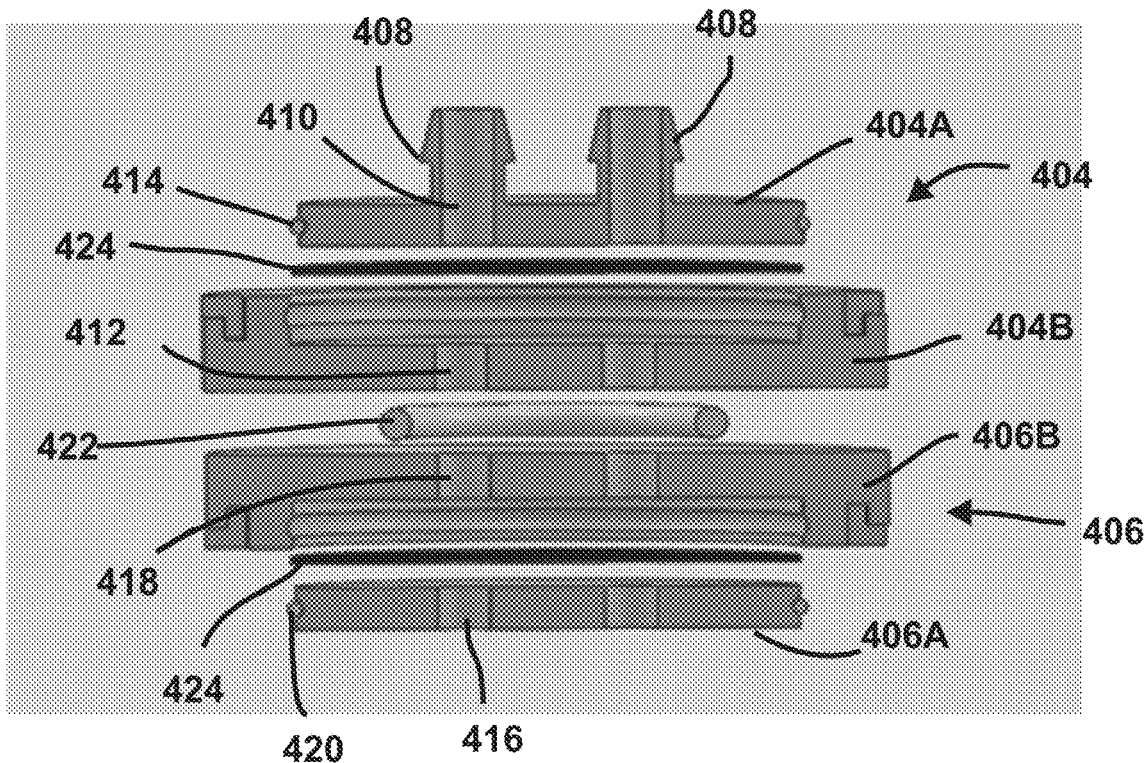
FIG. 9C is a cross-sectional view of the exploded view of FIG. 9B.
Figure 9D:
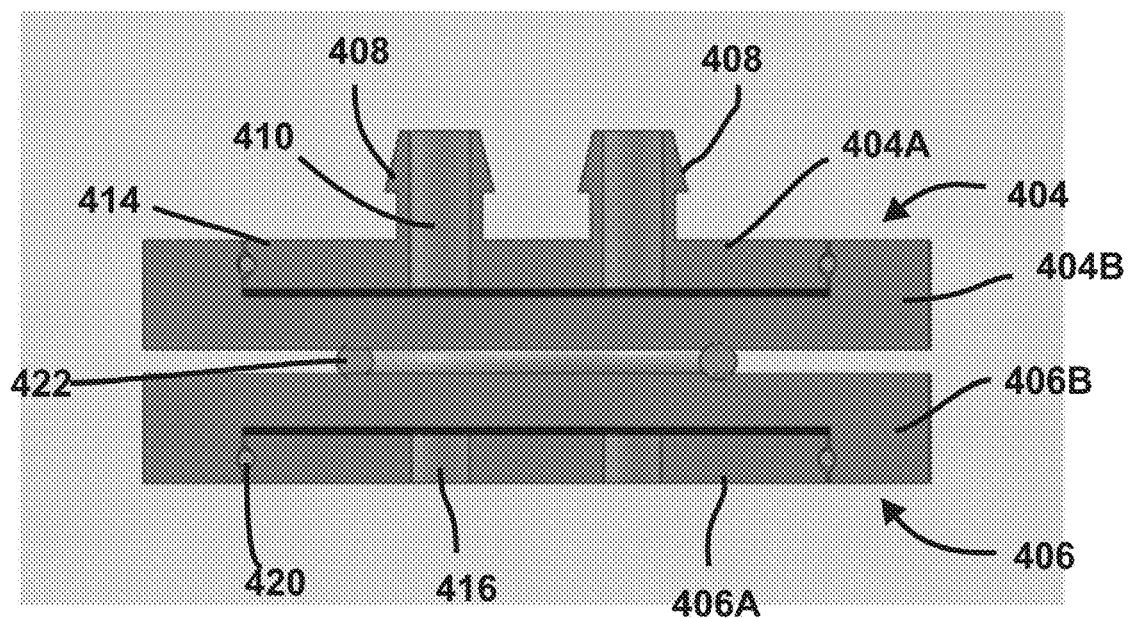
FIG. 9D is a cross-sectional view of the cap assembly of FIG. 9 with its upper and lower portions rotated into the sealed position.

Referring to FIGS. 9, 9A, 9B and 9C another aseptic cap assembly 400 is illustrated. In this embodiment, the cap 402 includes upper and lower rotating portions 404, 406 that are designed to seal off ports 408 from a bottle. FIG. 8 is an assembled view of the cap assembly 400. FIG. 9A is a cross-section of the assembled view of FIG. 9. FIG. 9B is an exploded view of the cap assembly 400. FIG. 9C is a cross-section of the exploded view of FIG. 9B. FIG. 9D is a cross-sectional view of the cap assembly 400 of FIG. 9 with its upper and lower portions rotated into the sealed position.

As with the prior embodiment, the cap assembly 400 in this embodiment allows for aseptic disconnect of the connection tubing from the bottle while maintaining sterility and integrity of the contents of the bottle.

For simplicity, the components for attaching the cap assembly 400 to a bottle are not shown. Similar to the cap assembly 300 in FIG. 8, the lower portion 406 attaches to a cap ring (not shown) that threads or otherwise connects to a neck on a bottle in a conventional manner.

The upper portion 404 includes an inner stationary portion 404A that includes the two ports 408, and an outer rotatable portion 404B. A first set of channels 410 extend through the ports 408 to a lower surface of inner stationary portion 404A. The outer rotatable portion 404B includes a second set of channels 412 that when the upper portion 404 is in its open position are aligned with the first set of channels 410 to permit flow between a first set of channels 410 and the second set of channels 412. An o-ring seal 414 is preferably located between the inner stationary portion 404A and the outer rotatable portion 404B.

In order to place the upper portion 404 is in its sealed position, the outer rotatable portion 404B is rotated ninety degrees relative to the inner stationary portion 404A. This results in the second set of channels 412 rotating out of alignment with the first set of channels 410. This prevents flow between the first set of channels 410 and the second set of channels 412.

The lower portion 406 is similar to the upper portion 404. Specifically, the lower portion 406 includes an inner stationary portion 406A and an outer rotatable portion 406B. A third set of channels 416 extend through the inner stationary portion 406A from an upper surface to a lower surface that, during use, is exposed to the interior of a bottle. The outer rotatable portion 406B includes a fourth set of channels 418 that when the lower portion 406 is in its open position are aligned with the third set of channels 416 to permit flow between a third set of channels 416 and the fourth set of channels 418. An O-ring seal 420 is preferably located between the inner stationary portion 406A and the outer rotatable portion 406B of the lower portion.

In order to place the lower portion 406 is in its sealed position, the outer rotatable portion 406B is rotated ninety degrees relative to the inner stationary portion 406A. This results in the fourth set of channels 418 rotating out of alignment with the third set of channels 416. This prevents flow between the third set of channels 416 and the fourth set of channels 418.

An O-ring seal 422 is preferably located between a lower surface of the upper outer rotatable portion 404B and an upper surface of the lower outer rotatable portion 406B.

A fluid-resistant lightweight gasket 424 is preferably located between the inner stationary portions and the outer rotatable portions of the upper portion 404 and lower portion 406. In one embodiment, the gasket is a paper fiber/Buna-N (nitrile) rubber blend, $\frac{1}{32}$" thick, however other gaskets can be used.

Although not shown, it is contemplated that an external clamp would be included to connect the upper portion to the lower portion such that the outer rotatable portions of the upper portion 404 and lower portion 406 can rotate together.

Figure 10:
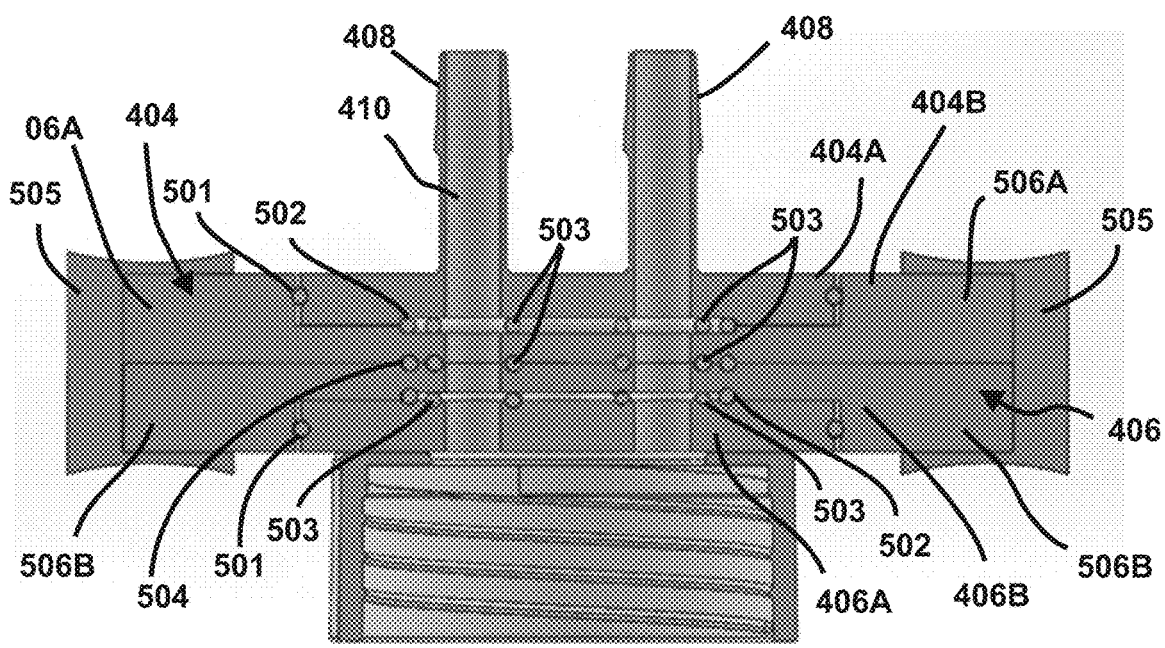
FIG. 10 is a cross-sectional view of a modified version of the embodiment shown in FIG. 9.

Referring to FIG. 10, a cross-sectional view of a modified version of the embodiment shown in FIG. 9 is illustrated. In this configuration, additional O-ring seals 501, 502, 503, and 504 are incorporated between various components, and the gaskets 424 have been removed. Specifically, as shown, the inner stationary portion 404A of the upper portion 404 is preferably disc shaped with an outer diameter and is located within a recessed seat of the outer rotatable portion 404B. An O-ring seal 501 is located preferably between the outer diameter of the inner stationary portion 404A and an inner diameter of the seat of the outer rotatable portion 404B. Similarly, the inner stationary portion 406A of the lower portion 406 is preferably disc shaped with an outer diameter and is located within a recessed seat of the outer rotatable portion 406B. An O-ring seal 501 is located preferably between the outer diameter of the inner stationary portion 406A and an inner diameter of the seat of the outer rotatable portion 406B.

Another O-ring seal 502 is located preferably between a lower surface of the inner stationary portion 404A of the upper portion 404 and an upper surface of the seat of the outer rotatable portion 404B of the upper portion 404. Similarly, another O-ring seal 502 is located preferably between an upper surface of the inner stationary portion 406A of the lower portion 406 and a lower surface of the seat of the outer rotatable portion 406B of the lower portion.

Smaller O-ring seals 503 are located between the lower surface of the inner stationary portion 404A of the upper portion 404 and the upper surface of the seat of the outer rotatable portion 404B of the upper portion 404 at the interface between each channel of the first set of channels 410 and the second set of channels 412.

Additional O-ring seals 503 are located between a lower surface of the outer rotatable portion 404B of the upper portion 404 and an upper surface of the outer rotatable portion 406B of the lower portion 406 at the interface between each channel of the second set of channels 412 and the fourth set of channels 418.

Further O-ring seals 503 are located between the upper surface of the inner stationary portion 406A of the lower portion 406 and the lower surface of the seat of the outer rotatable portion 406B of the lower portion 406 at the interface between each channel of the fourth set of channels 418 and the third set of channels 416.

An intermediate O-ring seal 504 is located between the lower surface of the outer rotatable portion 404B of the upper portion 404 and an upper surface of the outer rotatable portion 406B of the lower portion 406.

Each of the upper portion 404 and lower portion 406 preferably have diametrically opposed tabs 506A, 506B extending radially outward from their respective outer rotatable portions 404B, 406B. A removable cap 505 slides over the tabs 506A, 506B, thereby temporarily securing the upper portion 404 to the lower portion 406 so that they can rotate together.

Figure 11A:
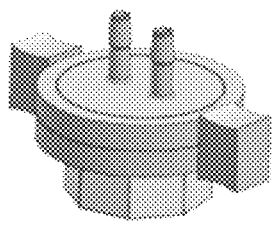
FIGS. 11A-11E are views illustrating various twisted positions of the cap assembly of FIG. 9 between opening and closing.
Figure 11B:
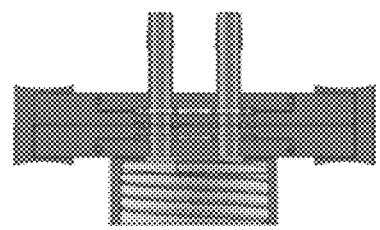
Figure 11C:
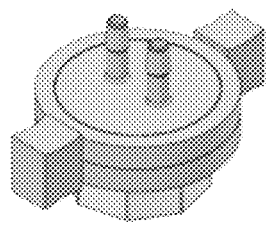
Figure 11D:
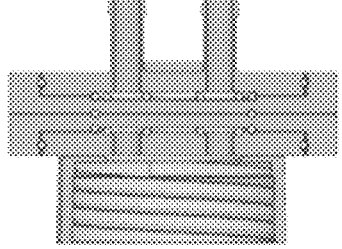
Figure 11E:
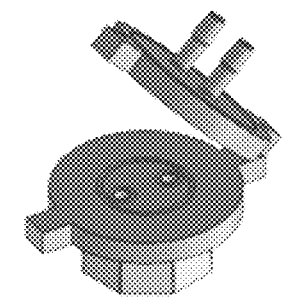

During use, when the cap assembly 400 is arranged as shown in FIGS. 10 and 11A, the channels are arranged so as to permit fluid flow and venting of air. The outer O-ring seals between the inner stationary portion and outer rotatable portion provides an interference fit seal between those components. The O-ring seals 503 between the channels and the O-ring seal 504 between the upper portion 404 and lower portion 406 provide a fluid tight seal while permitting relative rotation of the fixed and rotatable components parts.

With the tabs 506A, 506B locked together with the caps 505, the outer rotatable portions 404B, 406B are rotated clockwise relative to the fixed inner portions 404A, 406A. This closes off fluid flow along the channels with the O-rings providing fluid tight seals. The end caps 505 can then be removed unlocking the upper portion 404 and lower portion 406. The upper portion 404 can now be aseptically separated from the lower portion 406 with a sterile barrier existing between the seats of the outer rotatable portions 404B, 406B and the fixed inner portions 404A, 406A.

The present invention perm its the aseptic sealing and separation of a supply container after use, those permitting the supply container to be stored such as in a freezer for later use.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

Terms such as "about" or "approximately", unless otherwise defined or restricted in the specification, should be understood to define a variance of plus or minus 5%-10% to the numerical term referred to.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. An aseptic closure system for attaching to a container, the closure system comprises:

an upper section and a lower section, wherein at least one of either the upper section or the lower section includes a mounting component for removably attaching the upper section to the lower section;

the upper section includes an upper valve housing having at least one inlet port and at least one outlet port, the inlet port and the outlet port each include a conduit that permits fluid communication through the port with an interior of the upper valve housing, each port is configured to fluidly communicate with at least one component of which it is desired to maintain an aseptic connection, the lower section includes a top deck with an attachment mechanism located on a lower portion of the top deck for engaging with a top of the container, a lower valve housing is formed on and extends upward from an upper surface of the top deck, the lower valve housing includes two conduits that permit fluid communication through the lower valve housing to an interior of the lower section;

an upper rotary valve is mounted to the upper valve housing and configured to rotate relative to the upper valve housing, the upper rotary valve includes a cylindrical upper valve shaft that is rotatable within an upper bore extending through the upper valve housing, and two upper shaft conduits that extend through the upper valve shaft and are positioned such that, when the upper rotary valve is in an open state, the upper valve shaft conduits align with the inlet port and outlet port conduits and the lower valve housing conduits, thereby permitting fluid communication between the upper section and the lower valve housing;

the upper rotary valve has a closed state wherein the upper valve shaft is rotated relative to the upper valve housing such that the upper shaft conduits are not aligned with the inlet port and outlet port conduits and the lower valve housing conduits, and fluid communication between the upper section and the lower valve housing is prohibited by the upper valve shaft;

a lower rotary valve is mounted to the lower valve housing and is configured to rotate relative to the lower valve housing, the lower rotary valve includes a cylindrical lower valve shaft that is rotatable within a lower bore extending through the lower valve housing, and includes two lower shaft conduits that extend through the lower rotary valve shaft and are located such that, when the lower rotary valve is in an open state, the lower shaft conduits align with the lower valve housing conduits and, if the upper rotary valve is in its open state, fluid communication is permitted between the upper section and the lower section; and the lower rotary valve has a closed state wherein the lower valve shaft is rotated relative to the lower valve housing such that the lower shaft conduits are not aligned with the lower valve housing conduits and fluid communication between the upper section and the lower section is prohibited by the lower valve shaft.

2. The aseptic closure system of claim 1, wherein the mounting component is a mounting bracket on the upper valve housing, the mounting bracket extending downward from a base of the upper valve housing, the mounting bracket includes four walls that fit snuggly around an external surface of the lower valve housing so as to enclose a portion of the lower valve housing within the walls.

3. The aseptic closure system of claim 2 wherein the mounting bracket includes two open apertures on opposite sides of the bracket that snap onto ends of the lower valve shaft where the lower valve shaft extends out of either side of the bore of the lower valve housing, thereby removably securing the upper section to the lower section.

4. The aseptic closure system of claim 1, wherein the upper valve housing includes an extension that extends downward from a lower end of each of the inlet port conduit and outlet port conduit, each extension engages with an upper end of an opening corresponding one of the lower valve housing conduits.

5. The aseptic closure system of claim 4, wherein each extension and opening has a tapered interface that provide a press fit connection with one another to facilitate an aseptic connection between the upper valve housing and the lower valve housing.

6. The aseptic closure system of claim 1, wherein the inlet port, outlet port and the upper valve housing are formed as an integral component.

7. The aseptic closure system of claim 1, wherein inlet port and outlet port include hose barbs for connecting with tubing.

8. The aseptic closure system of claim 1, wherein the at least one component is selected from a fluid media bag, a secondary container, or processing equipment.

9. The aseptic closure system of claim 1, wherein the lower section further includes a skirt and wherein the attachment mechanism is threads formed on an internal surface of the skirt that are configured to removably engage with mating threads on the container.

10. The aseptic closure system of claim 1, wherein the upper valve shaft includes a tab formed on one end that can be grasped by a user for rotating the upper rotary valve relative to the upper valve housing between its open and closed states, and wherein the lower valve shaft includes a tab formed on one end of the lower valve shaft that can be grasped by a user for rotating the lower rotary valve relative to the lower valve housing between its open and closed states.

11. The aseptic closure system of claim 10, wherein the upper valve housing includes first and second stops for interacting with the tabs, the first stop is located so as to limit the rotation of the tab on the upper valve shaft such that when the tab contacts the first stop the upper rotary valve is in its closed state, and the second stop is located so that when the tab on the lower valve shaft contacts the lower stop when the lower rotary valve is in its open state.

12. The aseptic closure system of claim 11, wherein the first and second stops and the tabs are arranged such that the lower rotary valve cannot be rotated to is closed state until the upper rotary valve is first rotated to its closed state.

13. The aseptic closure system of claim 1, wherein the lower rotary valve is connected to the upper valve housing.

14. An aseptic closure system for attaching to a container, the closure system comprises:

an upper section and a lower section, wherein at least one of either the upper section or the lower section includes a mounting bracket for removably attaching the upper section to the lower section;

the upper section includes an upper valve housing having at least one inlet port and at least one outlet port, the inlet port and the outlet port each include a conduit that permits fluid communication through the port with an interior of the upper valve housing, each port is configured to fluidly communicate with at least one component of which it is desired to maintain an aseptic connection, the lower section includes a top deck with an attachment mechanism located on a lower portion of the top deck for engaging with a top of the container, a lower valve housing is formed on and extends upward from an upper surface of the top deck, the lower valve housing includes two conduits that permit fluid communication through the lower valve housing to an interior of the lower section;

an upper rotary valve is mounted to the upper valve housing and configured to rotate relative to the upper valve housing, the upper rotary valve includes a cylindrical upper valve shaft that is rotatable within an upper bore extending through the upper valve housing, and two upper shaft conduits that extend through the upper valve shaft and are positioned such that, when the upper rotary valve is in an open state, the upper valve shaft conduits align with the inlet port and outlet port conduits and the lower valve housing conduits, thereby permitting fluid communication between the upper section and the lower valve housing;

the upper rotary valve has a closed state wherein the upper valve shaft is rotated relative to the upper valve housing such that the upper shaft conduits are not aligned with the inlet port and outlet port conduits and the lower valve housing conduits such that fluid communication between the upper section and the lower valve housing is prohibited by the upper valve shaft;

a lower rotary valve is mounted to the lower valve housing and is configured to rotate relative to the lower valve housing, the lower rotary valve includes a cylindrical lower valve shaft that is rotatable within a lower bore extending through the lower valve housing, and includes two lower shaft conduits that extend through the lower rotary valve shaft and are located such that, when the lower rotary valve is in an open state, the lower shaft conduits align with the lower valve housing conduits and, if the upper rotary valve is in its open state, fluid communication is permitted between the upper section and the lower section;

the lower rotary valve has a closed state wherein the lower valve shaft is rotated relative to the lower valve housing such that the lower shaft conduits are not aligned with the lower valve housing conduits, such that fluid communication between the upper section and the lower section is prohibited by the lower valve shaft;

the mounting bracket removably connecting the upper valve housing to the lower valve housing, the mounting bracket extending either downward from a lower portion of the upper valve housing or upward from an upper portion of the lower valve housing;

wherein the upper valve shaft includes a tab formed on one end that can be grasped by a user for rotating the upper rotary valve relative to the upper valve housing between its open and closed states; and wherein the lower valve shaft includes a tab formed on one end of the lower valve shaft that can be grasped by a user for rotating the lower rotary valve relative to the lower valve housing between its open and closed states.

15. The aseptic closure system of claim 14, wherein the mounting bracket includes four walls that snuggly engage an external surface of the lower valve housing so as to enclose a portion of the lower valve housing within the walls, and the mounting bracket includes two open apertures on opposite sides of the bracket that snap onto ends of the lower valve shaft where the lower valve shaft extents out of either side of the bore of the lower valve housing, thereby removably securing the upper section to the lower section.

16. The aseptic closure system of claim 14, wherein the lower rotary valve is connected to the upper valve housing.

17. The aseptic closure system of claim 14, wherein the upper valve housing includes first and second stops for interacting with the tabs, the first stop is located so as to limit the rotation of the tab on the upper valve shaft such that when the tab contacts the first stop the upper rotary valve is in its closed state, and the second stop is located so that when the tab on the lower valve shaft contacts the lower stop when the lower rotary valve is in its open state.

18. The aseptic closure system of claim 14, wherein the first and second stops and the tabs are arranged such that the lower rotary valve cannot be rotated to is closed state until the upper rotary valve is first rotated to its closed state.

19. The aseptic closure system of claim 14, wherein the inlet port, outlet port and the upper valve housing are formed as an integral component.

20. The aseptic closure system of claim 14, wherein the lower section further includes a skirt and wherein the attachment mechanism is threads formed on an internal surface of the skirt that are configured to removably engage with mating threads on the container.

* * * * *